United States Patent [19]

King et al.

[11] Patent Number: 4,692,869
[45] Date of Patent: Sep. 8, 1987

[54] AIRCRAFT NAVIGATIONAL SYSTEMS AND METHODS FOR CREATING NAVIGATIONAL GUIDEPOINTS

[75] Inventors: Ethmer W. King; Robert C. Kircher, Jr.; David S. Yotsuuye, all of King County, Wash.

[73] Assignee: The Boeing Company, Seattle, Wash.

[21] Appl. No.: 716,979

[22] Filed: Mar. 28, 1985

[51] Int. Cl.⁴ .............................................. G06F 15/50
[52] U.S. Cl. .................................... 364/448; 364/451; 340/991; 342/401
[58] Field of Search ................ 364/424, 521, 443–452; 340/991, 993; 343/401–406

[56] References Cited

U.S. PATENT DOCUMENTS

| | | | |
|---|---|---|---|
| 2,671,621 | 3/1954 | Schuck | 364/444 |
| 3,581,073 | 5/1971 | Visher | 364/448 |
| 3,691,361 | 9/1972 | Perkins | 364/451 |
| 3,899,662 | 8/1975 | Kreeger et al. | 364/424 |
| 3,994,456 | 11/1976 | Post et al. | 364/448 X |
| 4,069,412 | 1/1978 | Foster et al. | 364/451 |
| 4,070,662 | 1/1978 | Narveson | 340/726 |
| 4,086,632 | 4/1978 | Lions | 364/444 |
| 4,212,067 | 7/1980 | Henderson | 364/460 |
| 4,413,322 | 11/1983 | Foster et al. | 364/448 |

Primary Examiner—Parshotam S. Lall
Assistant Examiner—Thomas G. Black
Attorney, Agent, or Firm—Hughes & Cassidy

[57] ABSTRACT

Aircraft navigational system and methods are disclosed for creating aircraft navigational guidepoints during in-flight operations. A digital computer and computer control displays provide dynamic and static display of the aircraft relative to the flight path and earth referenced data. In one embodiment, a new guidepoint is located and displayed at the intersection of a pilot selected radial and a track line, such as the aircraft projected flight path, defined by a series of guidepoints which are stored in the computer. The selected radial emanates from a selected geographical location defined by a known latitude/longitude, such as for example, preprogrammed NAVAIDS, geographical reference points and pilot entered geographical locations. The latitude/longitude and place-bearing-distance of the new guidepoint is calculated by first determining the great circle distance and true bearing from the NAVAID to each of the guidepoints using spherical geometry, and then comparing the true bearing of the selected radial to each set of adjacent guidepoints to determine between which set of adjacent guidepoints the selected radial lies. Then using geometric relationships and spherical geometry, the place-bearing-distance of the new guidepoint is determined.

48 Claims, 22 Drawing Figures

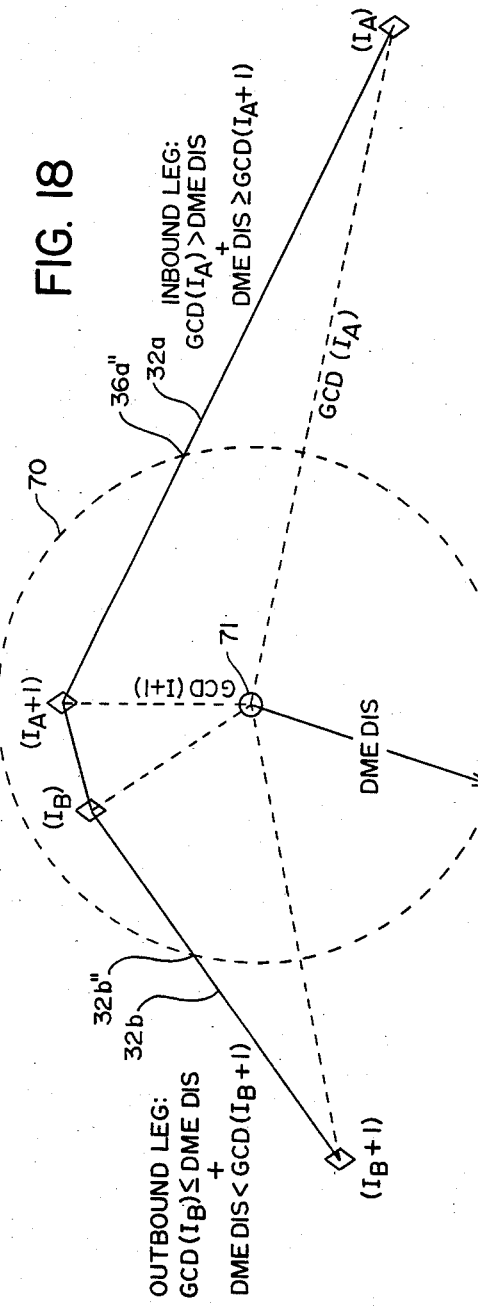

AIRCRAFT NAVIGATIONAL SYSTEMS AND METHODS FOR CREATING NAVIGATIONAL GUIDEPOINTS

TECHNICAL FIELD

The present invention relates to aircraft navigational systems and methods for creating aircraft navigational guidepoints, and more particularly to aircraft navigational systems and methods for creating aircraft navigational guidepoints utilizing VOR navigational equipment in conjunction with a digital computer and computer controlled display.

BACKGROUND OF THE INVENTION

For instrument navigation, most aircraft rely on a number of VHF omnirange stations (VOR) which are geographically situated throughout the world. These VOR stations transmit electronic signals in a 360° direction which, when received by navigational equipment aboard the aircraft, indicate to the aircraft pilot the aircraft bearing to the station; if the aircraft is equipped with distance measuring equipment (DME) the VOR signal received by the aircraft will also indicate the distance of the aircraft to the VOR station; VOR station is also referred to as a navigational station or NAVAID. The combination of bearing and distance information allows a pilot to pinpoint his location relative to the NAVAID, and by utilizing navigational charts which show the exact geographical location of the NAVAID, the precise location of the aircraft can be determined. To display the electronic position data transmitted by the NAVAID, the pilot relies upon a VOR receiver which can be manually tuned to the discrete transmitting frequency of the particular VOR station which the pilot chooses to navigate by. The pilot then selects a particular VOR radial by manually selecting that radial at the VOR receiver. The VOR display equipment in the aircraft then displays the aircraft geographic position relative to the selected radial as well as distance from the NAVAID, information hereinafter referred to as place-bearing-distance (PBD) information. PBD data can be utilized to create navigational points to guide the aircraft along its route thereby allowing the pilot much more flexibility in planning the route of the aircraft; these place-bearing-distance navigational guidepoints are also known as "waypoints".

Many of the sophisticated aircraft navigational systems include a programmable digital flight management computer (FMC) for programming flight navigational information prior to takeoff; the flight navigational information including guidepoints and active flight plan data defining the planned route of travel of the aircraft. Also included is a control display unit (CDU) for controlling the navigational system and displaying data to the aircrew; and a horizontal situation indicator (HSI) for displaying the navigational information such as the geographic location of NAVAIDS and guidepoints on a CRT screen located in the cockpit. The HSI displays the NAVAID guidepoints and flight path legs on the CRT together with the present position of the aircraft relative to those navigational points so that the aircrew has a pictorial presentation of the aircraft's journey. The flight management computer can be coupled to the aircraft's flight control system to automatically fly the planned route.

In order to allow the computer to be programmed in flight, the cockpit is equipped with an alphanumeric keypad accessible to the aircrew. Sometimes in-flight modification of the flight path is necessary due to traffic conflicts or weather changes. The aircrew enters the desired flight path into the computer by entering the guidepoints defining the modified flight path, the flight path information is then displayed at the CDU and the geographical locations of the guidepoints are symbolically displayed at the HSI.

It is desirable that any in-flight programming by the aircrew be accomplished as quickly and as easily as possible. Present day commercial airline aircraft are now being designed for operation by two pilots instead of three, government approval of the two-pilot commercial airline aircraft based on an aircraft design which allows for safe aircraft operation by a two pilot crew.

The use of NAVAIDS in conjunction with aircraft VOR receivers to create navigational guidepoints is of itself not new.

In U.S. Pat. No. 4,413,322—Foster, et al, there is disclosed an area navigation device which automatically establishes guidepoints along a preselected course line intersecting with any one of four cardinal radials of a VOR station.

In U.S. Pat. No. 4,220,994—Hendrickson, there is disclosed a microprocessor based system which uses geometrical relationships to assist in aircraft navigation.

In U.S. Pat. No. 2,671,621—Schuck, there is disclosed a navigation system which provides a number of nonconverging electronic guidepaths.

In U.S. Pat. No. 3,581,073—Visher, there is disclosed apparatus and methods for continuous computation of a course line from an aircraft to a destination point.

In U.S. Pat. No. 3,899,662—Kreeger, et al, there is disclosed a method and means for reducing data transmission in synthetically generated motion display systems.

In U.S. Pat. No. 3,919,529—Baker, et al, there is disclosed a radio navigation system utilizing navigational data for the generation of aircraft positional data with respect to a radio guidance transmitter system.

In U.S. Pat. No. 3,941,983 there is disclosed apparatus for combining positional data from VOR/DME radio navigation systems with data derived from an OMEGA reciver.

In U.S. Pat. No. 3,994,456—Post, et al, there is disclosed control apparatus for an aircraft navigation system which computes a predetermined curved path between two courses.

In U.S. Pat. No. 4,070,662—Narveson, there is disclosed a display generator for generating video signals at a CRT screen.

U.S. Pat. Nos. 3,899,662; 3,919,529; 3,941,983; 3,994,456; and 4,070,662 are all incorporated herein by reference in their entirety.

The following patents were disclosed in a search instituted in association with the present invention, the following patents disclosing aircraft navigational systems comprising electronic hardware adapted to create guidepoints for determining aircraft position: U.S. Pat. Nos. 3,750,942; 4,212,067; 3,803,611; 3,796,867; 3,778,601; 3,644,928; 3,621,211; 3,652,837; 3,659,291; 3,696,426; 3,486,815; 4,069,412; 3,838,427; 3,500,413; 3,831,010; 3,534,399; 3,140,391; 3,234,552; 3,696,671; and 4,283,705.

The following patent disclosing a slew control to generate guidepoints on a CRT map display unit under the control of a digital computer is assigned to the common assignee of the present invention and is disclosed for information purposes: U.S. Pat. No. 4,086,632—Lions.

SUMMARY OF THE INVENTION

It is a general object of the present invention to provide an improved aircraft navigational system and improved method for creating navigational guidepoints. The aircraft navigational system comprises receiver means for receiving electrical navigational signals from a selected navigational station, and for outputting a navigational radial signal defining a first selected navigational radial of the navigational station. Also included are computer means, including a memory, responsive to the navigational radial signal and arranged to provide first informational signal means indicating the geographic location of a plurality of predetermined selected guidepoints, and to provide a connecting line between the predetermined selected guidepoints. The computer means are arranged to respond to the navigational radial signal and to provide second informational signal means indicating a first point of intersection of the connecting line with the first navigational radial to define a first new guidepoint. The computer means is arranged to store the data defining the first new guidepoint in the memory.

In a preferred embodiment, the aircraft navigational system includes input means for inputting information defining a second selected navigational radial from a selected geographical location, and for outputting a second navigational signal defining the second selected navigational radial from the selected geographical location. The computer means is arranged to respond to the second navigational signal and to provide third information signal means indicating a second point of intersection of the connecting line with the second navigational radial to define a second new guidepoint. The computer means store the data defining the second new guidepoint in the computer memory. The selected navigational station and the selected geographical location each define a geographical fix. In addition, the first point of intersection and the second point of intersection each define an intersectional fix.

The aircraft navigational system also comprises informational display means responsive to the first, second and third information signal means to provide an informational display of data for navigating relative to the first and second new guidepoints.

The connecting line is comprised of a plurality of line segments, each line segment defined by a set of at least two of the predetermined selected guidepoints wherein the intersectional fix is located at one of the line segments. The computer means is arranged to determine the geographic location of the intersectional fix by identifying the predetermined selected guidepoints which define the line segment at which the intersectional fix is located, and to determine the geographic location of the guidepoints defining the intersected line segment. In addition, the computer means determines the location of the intersectional fix relative to one of the guidepoints defining the intersected line segment, and the relative location of the intersectional fix is used to determine the geographical location of the intersectional fix.

The computer means identifies the guidepoints defining the intersected line segment wherein the guidepoints comprise a first reference guidepoint and a second reference guidepoint. The guidepoints defining the intersected line segment are determined by comparing the geographical bearing from the geographical fix to each set of the predetermined guidepoints, to the geographical bearing of the selected navigational radial from the geographical fix. The set of guidepoints are identified as the first and second reference guidepoints when the bearing of the selected navigational radial is between the bearings from the geographical fix to the set of predetermined selected guidepoints. The computer means determines the location of the intersectional fix relative to a selected one of the reference guidepoints by determining the bearing of the intersectional fix from the selected reference guidepoint, and determining the distance between the intersectional fix and the selected reference guidepoint.

In another embodiment of the present invention, there is included an aircraft navigational system comprising input means for inputting information by an aircrew defining a selected distance from a selected geographical location, and for outputting a navigational distance signal defining a selected distance from the selected geographical location. The aircraft navigational system also includes computer means responsive to the navigational radial signal and arranged to provide first informational signal means indicating the geographical locations of a plurality of predetermined selected guidepoints. The computer means is also arranged to provide a connecting line between the predetermined selected guidepoints, and to respond to the navigational distance signal, and to provide a second informational signal means indicating the point of intersection of the connecting line with the navigational distance to serve as a new guidepoint. Data defining the new guidepoint is stored in the computer memory.

In addition the aircraft navigational system includes informational display means responsive to the first and second information signal means to provide an informational display of data for navigating relative to the new guidepoint.

The displayed data includes geographical locations of the aircraft, selected guidepoints, connecting line, point of intersection, selected geographical location, and the navigational distance as symbols on a cartographic display. The navigational distance is displayed as a circle having a center coincident with the selected geographical location, and a radius equal to the navigational distance.

The connecting line is comprised of a plurality of line segments wherein each line segment is defined by at least two of the predetermined selected guidepoints, and wherein the point of intersection is located at one of the line segments. The computer means is arranged to determine the geographic location of the point of intersection by identifying the predetermined selected guidepoints which define the line segment at which the point of intersection is located, and by determining the geographical locations of the guidepoints defining the intersected line segment. The computer means also determines the location of the point of intersection relative to one of the guidepoints defining the intersected line segment; the relative location of the point of intersection is used to determine the geographical location of the point of intersection.

The computer means identifies the guidepoints defining the intersected line segment, which includes a first reference guidepoint and a second reference guidepoint, by comparing the selected radial distance to the distances from the navigational station to each set of the guidepoints defining a line segment. The set of guidepoints are identified as the first and second reference guidepoints when the value of the selected radial distance is between the values of the distances from the selected geographical location to the set of guidepoints defining a line segment. The computer means determines the geographical location of the point of intersection by (a) dividing the distance between the first reference guidepoint and the second reference guidepoint into two substantially equal, subdivided segments, and (b) determining at which of the subdivided segments the point of intersection is located. The point of intersection is then determined by (c) dividing the intersected subdivided segment into two substantially equal, subdivided segments at a middle reference point, and (d) determining the distance from the middle reference point to the selected geographical location. Steps b, c and d are repeated until the difference between the distance from the middle reference point to the selected geographical location and the selected distance is within a predetermined value.

In a further embodiment there is provided an aircraft navigational system comprising receiver means for receiving navigational signals from a selected navigational station, and for outputting a navigational radial signal defining a selected navigational radial of the navigation station, and for outputting a navigation distance signal defining a selected navigational distance from the navigational station. The aircraft navigational system also includes computer means responsive to the navigational radial signal and to the navigational distance signal. The computer means responds to the navigational radial signal and to the navigational distance signal, and provides an informational signal indicating a point of intersection of the navigational distance with the navigational radial to serve as a new guidepoint. Also provided are informational display means responsive to the informational signal to provide an informational display of the geographical locations of the navigational distance, navigational radial, and the point of intersection.

In another embodiment there is provided an aircraft navigational system comprising input means for inputting information by an aircrew including (i) navigational distance data defining a selected distance from a selected geographical location and (ii) navigational radial data defining a selected bearing from the selected geographical location; and for outputting a navigational distance signal defining the selected distance from the selected geographical location, and a navigational radial signal defining the bearing from the selected geographical location. There is also provided computer means responsive to the navigational distance signal and to the navigational radial signal. The computer means is arranged to respond to the navigational radial signal and to the navigational distance signal and to provide an informational signal indicating the point of intersection of the navigational distance with the navigational radial to define a new guidepoint. Informational display means are responsive to the informational signal to provide an information display of the geographical locations of the navigational radial, the navigational distance and the point of intersection. The navigational radial, navigational distance, and the point of intersection are displayed as symbols on a cartographic display. The navigational distance is displayed as a circle having a center coincident with the selected geographical location and having a radius equal to the navigational distance.

In another embodiment there is provided an aircraft navigational system for locating and displaying a circle defining a selected navigational distance from a selected geographical location. The navigational system comprises input means for inputting the selected navigational distance from the selected geographical location, and for outputting a navigational distance signal defining a selected distance from the selected geographical location. Computer means are responsive to the navigational distance signal and characterized in that the computer means are predisposed to provide a first informational signal indicating the geographical locations of a plurality of points forming an arcuate path which defines a portion of a projected route of aircraft flight. The computer means is responsive to the inputs, including (i) a first selected geographic locational input defining a starting point of the arcuate path, (ii) a second selected geographic locational input defining an ending point of the arcuate path, (iii) a radius input defining a radius of the arcuate path having a center coincident with the selected geographical location, (iv) a subtended angle input defining an angle subtended by the arcuate path between the starting point and the ending point and (v) an initial course input defining an initial direction of the arcuate path from the first selected geographical location. The computer means further comprises means to provide a second informational signal indicating the geographical locations of a plurality of points defining a circle having a center coincident with the selected geographical location, and having a radius equal to the selected navigational distance. The circle represents a constant omnidirectional distance from the selected geographical location. The computer means defines the initial course as zero when the subtended angle is a value of 360°, and defines the initial course as 180° when the subtended angle is a value of −360°. The computer means responds to inputs comprising (i) a third geographic locational input defining a starting point and ending point of the circle, and (ii) a radius input defining the radius of the circle. The aforementioned inputs provide a second informational signal. An informational display means is responsive to the second informational signal to provide a cartographic display of the circle.

It is therefore an object of the present invention to provide an apparatus and method for creating aircraft navigational guidepoints.

DESCRIPTION OF THE DRAWINGS

These and other objects and advantages of the present invention will become more readily apparent upon reading the following detailed description and upon reference to the attached drawings in which:

FIGS. 3A and 3B illustrate flight plan pages displayed at the control display unit wherein FIG. 3A illustrates a FIX page and FIG. 3B illustrates a LEGS page;

FIG. 18 is a diagrammatic representation defining various distance relationships in order to locate one or more sets of adjacent guidepoints which define flight path legs intersecting a selected distance.

Figure 1:
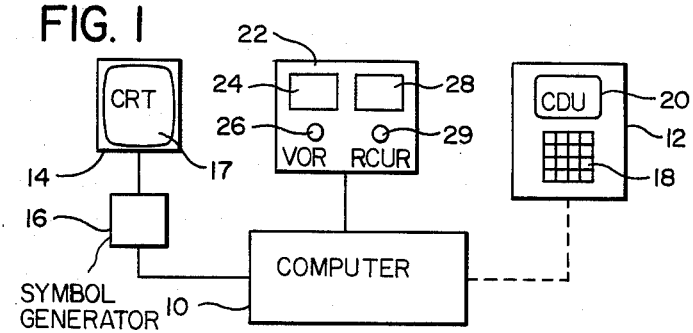
FIG. 1 is a block diagram of an aircraft navigational system of the present invention including a flight management computer, control display unit, VOR receiver, and horizontal situation indicator.

While the present invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention.

DETAILED DESCRIPTION OF THE INVENTION

Figure 2:
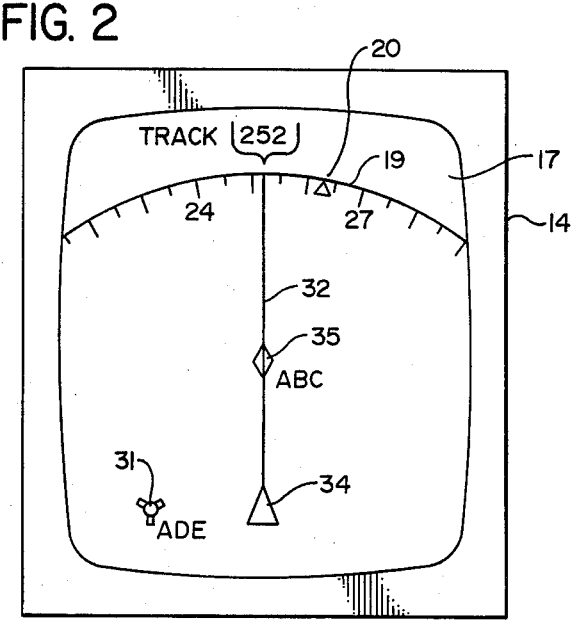
FIG. 2 illustrates a map mode display of an aircraft, aircraft flight path, and preprogrammed geographical locations utilizing a preferred aircraft navigational system.
Figure 3A:
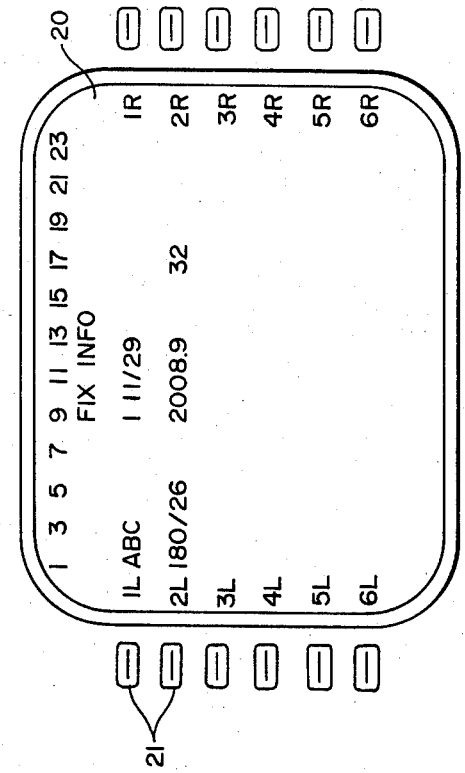
Figure 3B:
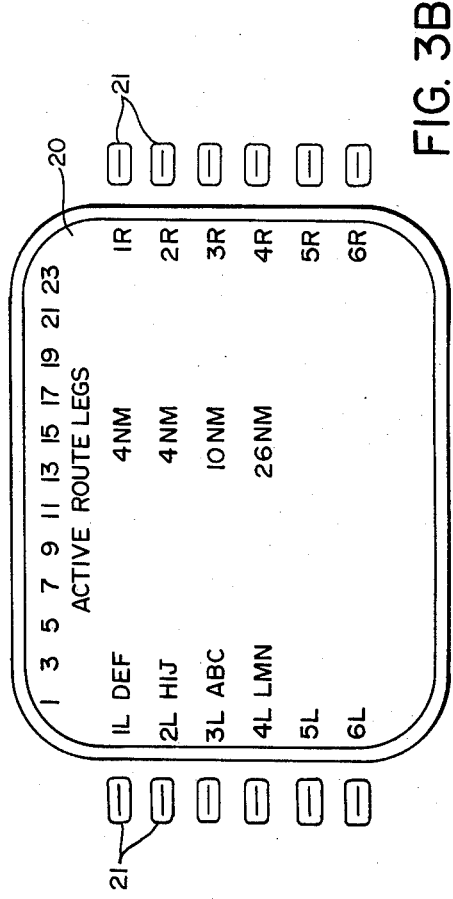

Referring to FIG. 1, there is shown an aircraft navigational system comprising a navigational computer 10 interconnected with a control display unit 12, and a horizontal situation indicator 14; horizontal situation indicator 14 includes a character generator 16 and a CRT screen 17 for the cartographic display of NAVAIDS, guidepoints, aircraft route of flight, and selected radials as shown in FIG. 2, as well as aircraft track and heading information. CDU 12 and CRT 17 are located in the aircraft cockpit to interface with the aircrew. Control display unit (CDU) 12 includes an alphanumeric keypad 18, with dedicated mode keys, which is a primary method for entering flight navigational data into computer 10, as well as selecting modes of operation, and for controlling the display of data at CRT screen 17 and display window 20 located on the front of CDU 12. CDU 12 includes a FIX page, illustrated in FIG. 3A, wherein place-bearing-distance data pertaining to a selected geographical location stored in computer 10 can be alphanumerically displayed and modified, e.g., FIX ABC. CDU 12 also includes a LEGS page, illustrated in FIG. 3B, including a separate line for a leg of the flight plan, wherein a data field listing each fix defining each leg of the flight plan can be alphanumerically displayed and modified on individual lines of the page by pressing an appropriate line select key 21 located at either side of CDU window 20. A place-bearing-distance may be transferred from the FIX page to the LEGS page via the CDU scratchpad by pressing the line select key 21 adjacent to the selected line. The place-bearing-distance is placed on the selected line of the LEGS page corresponding to the leg of the flight plan wherein the place-bearing-distance entry lies. For example, FIX ABC (FIG. 3A) may be transferred to the CDU scratchpad by pressing corresponding line key 21. By calling up the appropriate LEGS page and pressing the corresponding line key 21, FIX ABC may be line selected to the appropriate location in the flight plan route.

Computer 10 is a programmable digital computer including permanent memory for storage of NAVAID data including the respective latitudes/longitudes and named identifiers thereof, and (ii) selected geographical reference points (GRPs) including the respective latitudes/longitudes and named identifiers thereof. Geographical reference points (GRPs) define geographical locations along the route of flight which are automatically displayed at CRT 17 and CDU window 20, or which may be accessed by their named identifier via keypad 18 for display at CRT 17 or CDU window 20. Computer 10 includes temporary memory for the storage of active flight plan data including guidepoint place-bearing-distance data, as well as selected reference points (SRPs) which define pilot selected geographical locations and which are entered as a latitudes/longitudes via keypad 18 for display at CRT 17 and window 20. Computer 10 also includes an arithmetic unit for performing calculations to create a flight plan route utilizing the geographical locations of selected NAVAIDS, GRPs, SRPs, guidepoints and other navigational reference information. Computer 10 determines the track to be flown between these flight plan geographical locations and displays the track information cartographically and alphanumerically at CRT 17 (FIG. 2). For definition purposes, a guidepoint is typically an identified magnetic bearing and distance from a NAVAID, geographical reference point (GRP) or selected reference point (SRP). However, a guidepoint may be more broadly defined as any geographical location which is defined by a known latitude and longitude, such as for example a NAVAID, GRP OR SRP.

Navigation and position data is supplied from computer 10 to symbol generator 16 which generates the required symbology and interface signals for CRT display. The data supplied by computer 10 includes (i) map background information such as flight path and location of guidepoints, NAVAIDS, GRPs, SRPs and airports relative to the aircraft, and (ii) airplane dynamic data such as track and ground speed, time of distance to next guidepoint and computed winds. The display at CRT 17 includes two modes (i) a map mode wherein the aircraft position is dynamically displayed relative to the flight path and to other earth references data such that the display is dynamically changing around the aircraft, and (ii) a plan mode wherein a portion of the flight plan route is displayed statically in reference to a guidepoint along the route. All of the symbols are drawn on the face of CRT 17 using known stroke writing techniques. It will be appreciated that the software necessary to generate the above mentioned symbology is known in the art and within the knowledge of one having ordinary skill in the art.

Preferably, the aircraft navigational system of the present invention utilizes air navigational equipment, currently aboard the Boeing 757/767 aircraft as of February, 1985, manufactured by Sperry Flight Systems of Phoenix, Ariz., including Sperry Flight Management Computer which bears Part Number 404-6833-944, Sperry Control Display Unit which bears Part Number 403-8170-905; and a Symbol Generator Manufactured by Rockwell International, Collins Division, which bears Part Number 622-5045-030, and Rockwell CRT which bears Part Number S2422404-601.

Utilizing the preferred aircraft navigational equipment, there is shown in FIG. 2 a typical map mode presentation at CRT 17 for providing navigational information to the aircrew. There is shown at CRT 17 a computer generated compass heading display 19 and a heading marker 20 for providing the heading of the aircraft relative to magnetic north. In order to provide a cartographic display of the projected aircraft track, i.e., flight path, there is shown a vertically oriented track display line 32 which represents a line joining two or more geographical locations stored in computer 10 (FIG. 1) and displayed via character generators 16. In order to provide a visual display of the geographical location of the aircraft relative to the projected flight path 32, an aircraft symbol 34 is provided at the lower end of track 32. Continuous inputs from the aircraft's inertial navigation system are provided to computer 10 to display aircraft symbol 34 at a proper geographical location relative to flight path 32. During inflight operation of the aircraft, the aircrew continuously monitors and corrects for changes in the aircraft's position relative to the projected flight path 32 by viewing CRT 17. Also displayed at CRT 17 are the preprogrammed geographical locations of selected NAVAIDS, GRPs, SRPs and waypoints such as VOR station 31, identified as "ADE", and geographical reference point 35, identified as "ABC". In the "map mode" position in which the aircraft position is displayed dynamically relative to the earth reference geographical locations, a pictorial display of the forward movement of the aircraft is provided by computer 10 and character generator 16 wherein earth reference points, such as NAVAIDS, GRPs and SRPs, are continuously moving in a downward direction relative to aircraft symbol 34. As the aircraft continues on its flight, new NAVAIDS, GRPs and SRPs are displayed at the top of CRT screen 17 in order to represent the progress of the aircraft along its projected route of flight.

Figure 12:
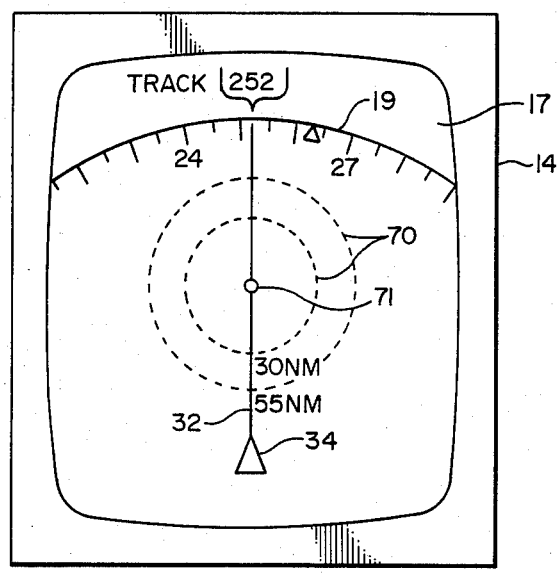
FIG. 12 illustrates a map mode display of a circle on the HSI CRT utilizing the method described in FIG. 13.

CDU 12 includes a FIX mode key for selection of a FIX page. Selected geographical fixes including NAVAIDS and GRPs may be entered into the FIX page at keypad 18 utilizing the assigned identifier, whereas an SRP may be entered into a FIX page as a latitude/longitude. A symbol identifying the selected fix is then displayed at CRT 17 (FIG. 2). Selected radials may be entered into the CDU FIX page at keypad 18 which are displayed at CRT 17 as radials emanating from the selected fix. In addition, a selected distance may be entered into the FIX page at keypad 18 which is displayed at CRT 17 as a circle located circumferentially about the selected fix at a constant radius equal to the selected distance (FIG. 12).

In a preferred embodiment of the invention illustrated in FIG. 1, the aircraft navigational system utilizes a VOR receiver 22 including a window 24 at the front thereof for displaying the VOR frequency selected by a dial 26 located below window 24, and a window 28 for alphanumerically displaying the VOR radial selected by a dial 29 located below window 28. VOR receiver 22 is interconnected with computer 10 for transfer of VOR navigational data thereto.

Figure 14:
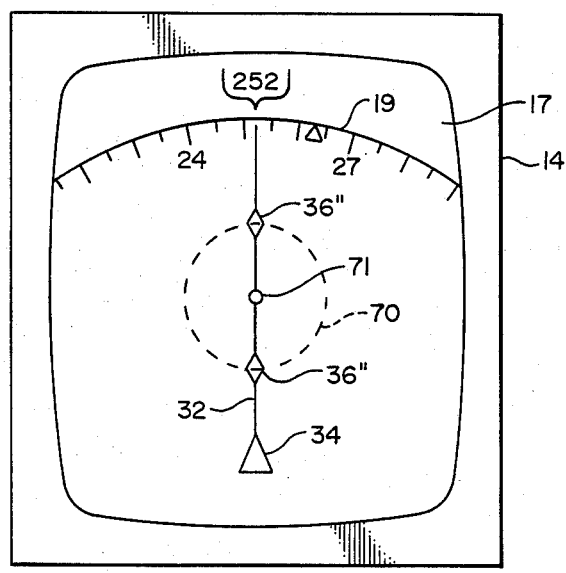
FIG. 14 is a map mode display of navigational guidepoints created by the intersection of a selected distance and the aircraft projected flight path.
Figure 19:
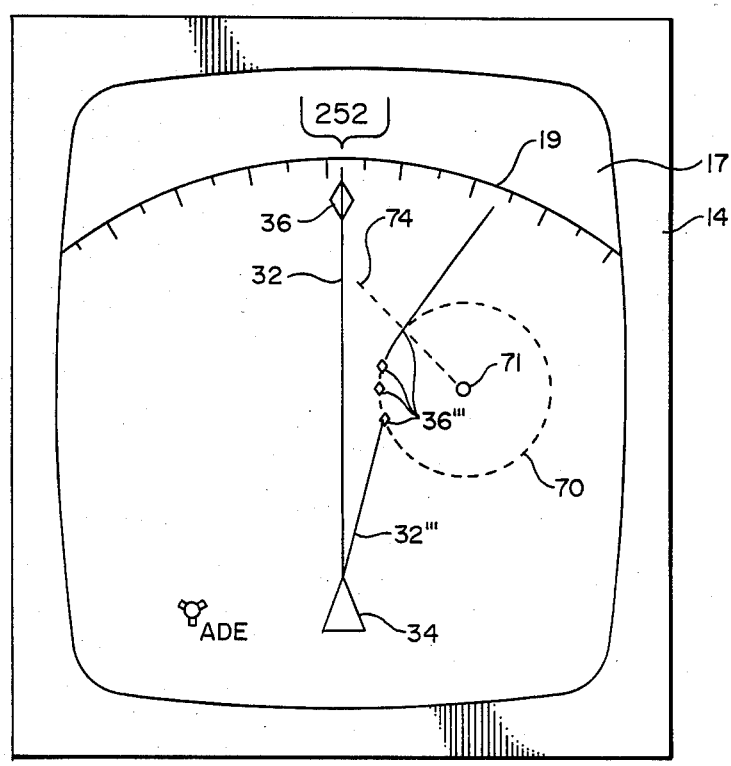
FIG. 19 illustrates a map mode display of navigational guidepoints created by the intersections of a plurality of pilot selected radials with a pilot selected distance.

Utilizing the present invention, navigational guidepoints are created by: (i) the intersection of a track line joining two or more guidepoints, e.g., the aircraft projected flight path, with one or more selected radials selected; (ii) intersection of a track line joining two or more guidepoints with one or more selected DME distances as shown in FIG. 14; or (iii) intersection of one or more selected radials with one or more selected distances as shown in FIG. 19.

Although a preferred embodiment of the present invention will be described with reference to the creation of guidepoints by the intersection of VOR radials and DME distances with the track line, the present invention also includes the creation of guidepoints by (i) the intersection of a track line with radials emanating from GRPs and SRPs, (ii) the intersection of a track line with selected distances from the GRPs and SRPs, and (iii) intersection of GRP and SRP radials with GRP/SRP selected distances.

CREATION OF NAVIGATIONAL GUIDEPOINTS AT THE INTERSECTION OF A TRACK LINE WITH ONE OR MORE SELECTED RADIALS

Figure 4:
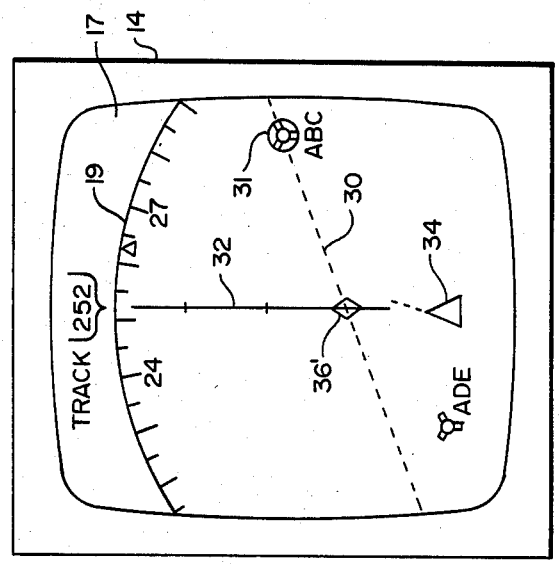
FIG. 4 illustrates a map mode display of a navigational guidepoint on the horizontal situation indicator CRT utilizing the method described in FIG. 6.

Referring now to FIG. 4, there is shown a map mode display of one embodiment of the present invention wherein one or more guidepoints are created by intersection of a line joining two or more guidepoints with one or more selected radials. Typically the line joining two or more guidepoints comprises the projected aircraft path; however, it should be realized the the invention may be utilized to determine a new guidepoint which is defined by (i) a line joining two or more predetermined selected guidepoints, one or more of which do not define the aircraft projected flight path; and (ii) a selected VOR radial. The graphical representation is displayed at CRT 17 of HSI 14, wherein there is displayed a pilot selected VOR radial 30 radiating from a pilot selected VOR station 31, radial 30 intersecting aircraft projected flight path 32 to create a new guidepoint 36', located vertically above aircraft symbol 34. Pressing the "FIX" mode key of CDU 12 in conjunction with other selected keys causes a selected FIX page to be displayed thereon wherein place-bearing-distance data pertaining to the selected FIX may be displayed and modified. By placing VOR receiver 22 in a "manual" mode and entering a NAVAID identifier into the FIX page which has a corresponding VOR frequency selected at window 24, the radial 30 selected at VOR dial 29 is provided to computer 10 and symbol generator 16 for display cartographically at CRT 17. When radial 30 crosses a flight path leg, the place-bearing-distance of guidepoint 36' is automatically entered into the temporary memory of computer 10 and displayed on the FIX page. This place-bearing-distance data is line selected into the CDU scratch pad, moved to the LEGS page where the geographical guidepoints defining the route of flight are located, and entered as a new guidepoint in the flight plan. It should be appreciated that simultaneously with the display of NAVAID 31, guidepoints 36, flight path legs, and radial 30 at CRT screen 17, place-bearing-distance data defining NAVAID 31, guidepoints 36 and selected radial 30 are also displayed at window 20 of CDU 12 (FIG. 1) in an alphanumeric format, e.g. SEA 090/27. Therefore, although it is possible to utilize the present invention without display of any one of or all of the following at CRT 17: NAVAID, guidepoint and flight path data, by utilizing a place-bearing-distance format displayed at CDU window 20, display of this navigational data cartographically at HSI CRT 17 provides a simpler and more efficient format for creating new guidepoints 36'.

Prior to the present invention, there were several methods for creating and displaying new navigational guidepoints depending upon whether or not each guidepoint had been preprogrammed into the memory of computer 10. In the case where the new guidepoint was stored in memory, the pilot was required to enter the appropriate identifier for the desired guidepoint by pressing the appropriate buttons on CPU keypad 18. Generally the pilot referred to a code book for obtaining the appropriate identifier, or the pilot accessed a list of identifiers for display at window 20 by activating keypad 18. In the case where the guidepoint had not been preprogrammed into computer memory, the pilot was required to obtain the geographical location of each guidepoint, usually defined as a latitude and longitude, or bearing and distance from a specific NAVAID, and then enter this information into the computer by pressing the appropriate buttons on keypad 18.

Figure 5:
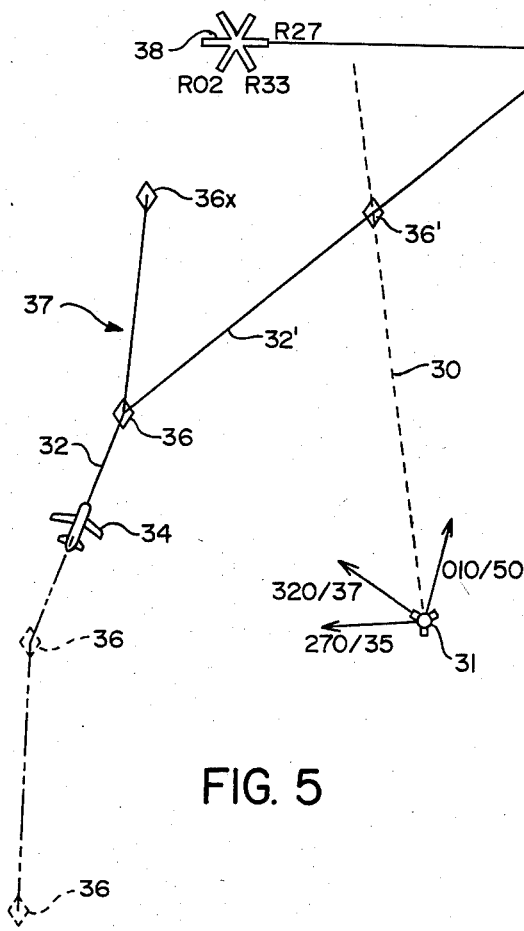
FIG. 5 is a diagrammatic representation of an aircraft route of flight to a destination airport.

Referring to FIG. 5, there is shown a plurality of guidepoints 36 interconnected by a track or connecting line, indicated at 37, which comprises the aircraft projected route of flight. Adjacent guidepoints 36 define individual flight path legs 32 which comprise segments of the projected flight path. Aircraft 34 tracks these flight path segments 32 until reaching the vicinity of an airport 38 where aircraft 34 makes either a visual approach or an instrument approach and landing as weather and traffic conditions dictate. A typical situation may arise wherein the crew of aircraft 34 planned its flight to guidepoint 36x where a visual approach and landing at runway 02 was planned. Due to a change in the wind direction at airport 38, the duty runway is changed to runway 33. Waypoint 36x will not prepare aircraft 34 for an approach to runway 33, therefore a new approach guidepoint must be programmed into computer 10 by the pilot, and a distance and course to this new guidepoint must be determined. A guidepoint 36y was preprogrammed into computer 10 prior to flight and is now displayed on CRT 17, however, guidepoint 36y is an approach guidepoint to runway 27 and not usable as an approach point for runway 33. In order to create a suitable approach guidepoint to runway 27, prior to the present invention, the pilot accessed computer 10 via keypad 18 to determine if there was a guidepoint preprogrammed therein to provide an approach point to runway 33. If there was no preprogrammed guidepoint, the pilot obtained the geographical location of the suitable approach point, either as a bearing and distance from a suitable NAVAID or a latitude and longitude, and then entered this data into computer 10 via keypad 18.

In contrast, however, in the present invention, the pilot rotates VOR receiver dial 29 (FIG. 1) until the selected radial 30 (FIG. 5) crosses line segment 32' connecting guidepoints 36 and 36y, at the desired location. The numerical value of selected radial 30 is transmitted to computer 10 which determines the geographical location of the point of intersection to define a new guidepoint. The alphanumerical place-bearing-distance of the new guidepoint is determined by computer 10 in a manner to be described shortly and then transmitted to CDU 12 for display at the CDU FIX page. The pilot line selects this place-bearing-distance into the appropriate location on the LEGS page and "executes" this entry thereby entering guidepoint 36' into computer 10 for display at HSI CRT 17. A track line 32' connecting guidepoint 36' to guidepoint 36 and to destination 38 is displayed to provide a visual path for the aircrew to monitor when navigating aircraft 34 to new guidepoint 36' and on to destination 38.

Figure 6:
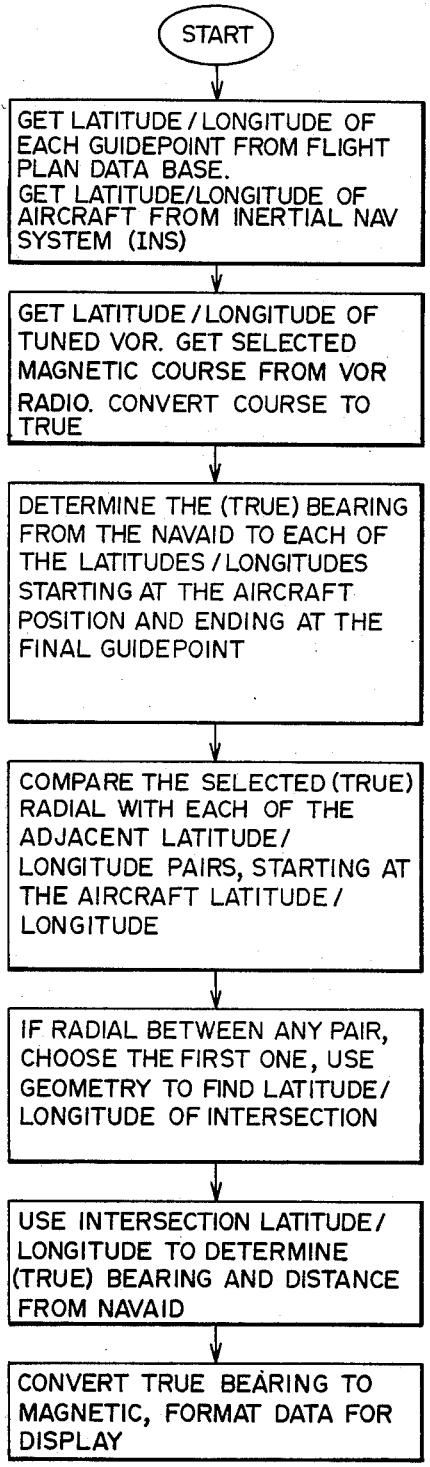
FIG. 6 is a flow chart broadly describing a method of creating aircraft navigational guidepoints by intersection of the aircraft projected flight path with a selected VOR radial.

Referring now to FIG. 6, there is shown a flow chart describing an overview of a method for creation of guidepoint 36' in FIGS. 4 and 5. Initially, the latitude/longitude of each guidepoint of the active flight plan is retrieved from the data base of flight management computer 10; the latitude and longitude of each flight path guidepoint typically preprogrammed into computer 10 prior to flight. The latitude and longitude of the aircraft is retrieved from the aircraft's inertial guidance system as needed. As the pilot selects a particular VOR station by selecting its frequency at dial 26, (FIG. 1) the latitude and longitude of the VOR station is retrieved from a preprogrammed lookup table in computer 10. After tuning in the VOR station, the pilot selects the desired radial at VOR dial 30 (FIG. 1), with the remaining process steps resulting in the creation of a new navigational guidepoint 36' accomplished by computer 10 in conjunction with HSI 14 and CDU 12.

Figure 7:
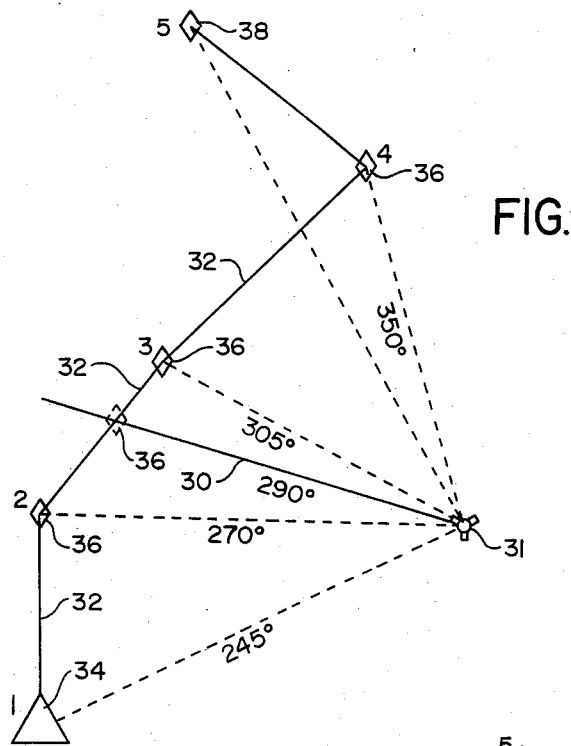
FIG. 7 is an illustration of an aircraft flight plan route wherein the relative bearing from the NAVAID to each guidepoint is determined in order to locate the set of adjacent guidepoints defining a flight path leg which intersects with a selected VOR radial.
Figure 8:
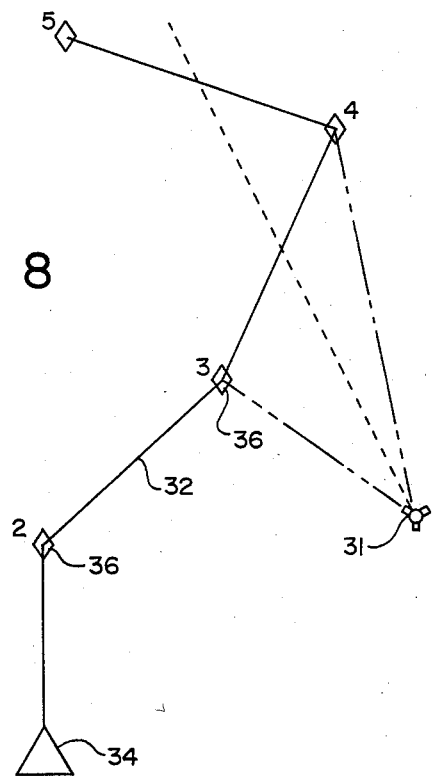
FIG. 8 is an illustration of an aircraft flight plan route wherein a selected VOR radial intersects two flight path legs each defined by a set of adjacent guidepoints respectively.

Initially, the selected radial in degrees magnetic is converted to degrees true by adding or substracting the magnetic variation of the aircraft's present geographic location. The true bearing from the VOR station to each of the preprogrammed guidepoints including the aircraft's destination, as well as the true bearing from the VOR station to the aircraft, are determined to obtain a plurality of checkpoints so that each checkpoint is defined by its true bearing from the VOR station. The pilot selected VOR radial is then compared with each set of adjacent checkpoints starting at the aircraft's present position, to determine between which adjacent set of checkpoints the selected VOR radial lies. For example, in FIG. 7 there is shown a number of checkpoints as they would appear on CRT 17 of HSI 15. These checkpoints, designated 1 through 5, including guidepoints 36, destination 38 and aircraft location defined by aircraft symbol 34 are joined by flight path legs 32. The true bearing of each checkpoint from VOR station 31 is shown; the selected VOR radial 30, e.g. 290°, lying between adjacent guidepoints 2 and 3, e.g. 270° and 305°. If a selected VOR radial lies between two sets of adjacent checkpoints as shown in FIG. 8, the set of adjacent checkpoints which are sequentially closer to the aircraft, i.e. guidepoints 3 and 4, are selected.

After determining between which set of adjacent checkpoints selected radial 30 (FIG. 7) lies, the latitude and longitude of the intersection point of flight path leg 32 with selected radial 30 is determined; the intersection point defined as newly created guidepoint 36'. The latitude/longitude of guidepoint 36' is then calculated in order to determine the true bearing and distance of guidepoint 36' from VOR station 31 thereby defining guidepoint 36' as a place-bearing-distance (PBD) from VOR station 31.

Figure 9A:
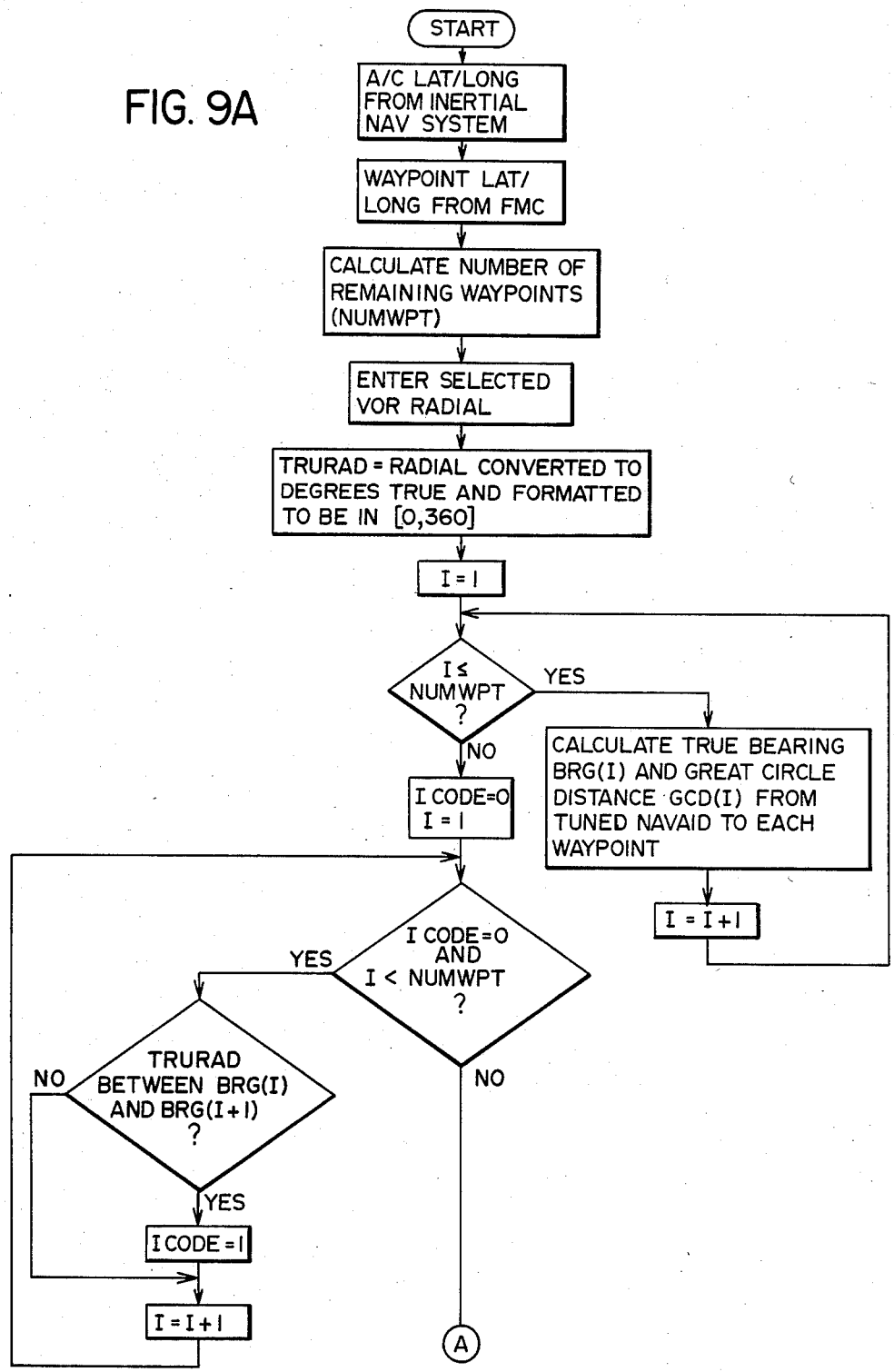
FIGS. 9A and 9B are a detailed flow chart of the method of determining aircraft navigational guidepoints described in FIG. 6.
Figure 9B:
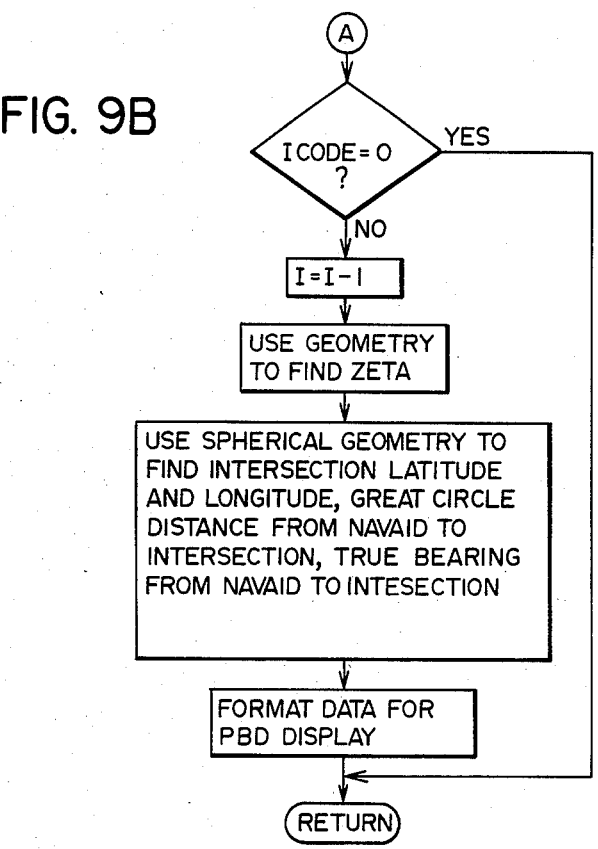
Figure 10:
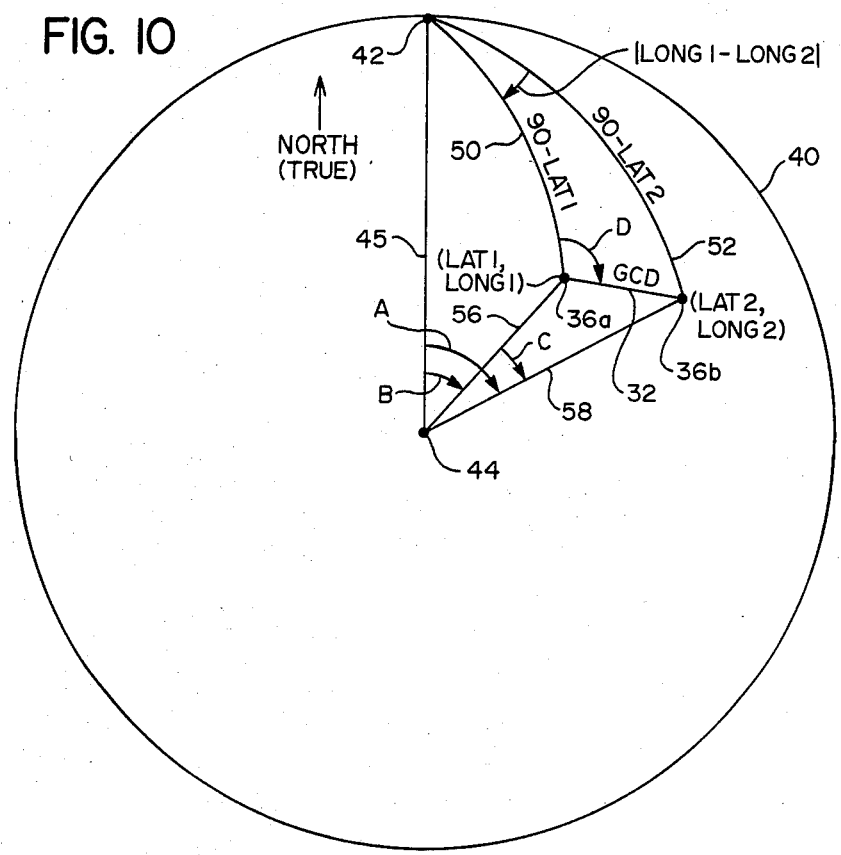
FIG. 10 is a diagrammatic representation of the distance and angular relationships for determining (i) the great circle distance and true bearing between two geographical locations each having a known latitude/longitude; and (ii) the geographical location (latitude/longitude) of a second location utilizing the great circle distance and bearing from a first geographical location.

A more detailed description of the present embodiment is provided by referring to the flow chart in FIGS. 9A and 9B wherein the number of remaining guidepoints (NUMWPT), is defined as the number of checkpoints remaining in the aircraft route of flight; the term "checkpoints" including the aircraft, destination and remaining guidepoints. After conversion of the selected VOR magnetic radial to true, the bearing from the VOR station to each of the checkpoints, i.e. guidepoints, aircraft and destination, is determined in the following manner. The great circle distance and true bearing between two geographical locations identified by their respective latitude/longitude, such as between a VOR station and a checkpoint, are calculated by using known spherical geometric relationships. Referring to FIG. 10, there is shown a representation of the earth indicated at 40, including a true north point 42 atop thereof, and a center 44; a reference line 45 connects true north point 42 with earth center 44. Two guidepoints 36a, 36b located on the surface of earth 40 are also identified by their respective latitude and longitudes, (LAT 1, LONG 1) and (LAT 2, LONG 2) respectively. In order to provide a geometric representation of the geographic locations of guidepoints 36a, 36b, a distance 32 between guidepoints 36a and 36b is measured over the surface of the earth as a great circle distance (GCD); a great circle distance is defined as the shortest route between any two points on the earth's surface. The great circle distance between north point 42 and guidepoint 36a is identified as reference line 50; the great circle distance between north point 42 and guidepoint 36b identified as reference line 52. The radial distance between earth center 44 and guidepoints 36a, 36b respectively is represented by radius reference lines 56, 58 respectively. The angular distance between true north reference line 45 and radius reference line 56 is identified as an angle B, equivalent to an angle of 90° minus LAT 1; the angular distance between north reference line 45 and radius reference line 58 is identified as an angle A, equivalent to an angle of 90° minus LAT 2. The angular distance between radius reference lines 56 and 58 is identified as an angle C. An angle D identifies the angular distance between reference line 50 and flight path leg 32.

In order to determine (1) the length of flight path leg 32, i.e. the great circle distance between geographical locations identified by their respective latitude/longitudes, and (2) the true bearing (angle D) from guidepoint 36a to guidepoint 36b, the following derivation is utilized.

DERIVATION NO. I

A known geometric relationship, the law of cosines for sides of oblique spherical triangles, is:

$$\cos(C) = \cos(A) \cdot \cos(B) + \sin(A) \cdot \sin(B) \cdot \sin(A) \cdot \cos(\Delta LONG)$$

wherein $\Delta$LONG equals absolute value of (LONG 1 − LONG 2), hereinafter referred to as equation $\alpha$. (See *CRC Standard Mathematical Tables.* CRC Publications, 1967, p. 162). By substitution of the values shown in FIG. 10 for angles A and B, and determining the inverse cosine of equation $\alpha$, a value of angle C representing the angular distance between guidepoints 36b, 36a is calculated. The great circle distance between guidepoints 36a, 36b is then calculated as C multiplied by radius of the earth (Re). Therefore, by substitution from FIG. 10:

$$\cos C = \cos(90-LAT2) \cdot \cos(90-LAT1) + \sin(90-LAT2) \cdot \sin(90-LAT1) \cdot \sin(90-LAT2) \cdot \cos(\Delta LONG).$$

Therefore:

$$\text{angle } C = \text{inverse } \cos[\cos(90-LAT2)\cos(90-LAT1) + \sin(90-LAT2)\sin(90-LAT1)\sin(90-LAT2)\cos(\Delta LONG)],$$

and:

$$GCD = \text{Angle } C \cdot Re.$$

In addition, it is known that:

$$\cos(90-LAT2) = \cos(90-LAT1) \cdot \cos(C) + \sin(90-LAT1) \cdot \sin(C) \cdot \cos(D).$$

Therefore:

$$\cos(D) = \frac{[\sin(LAT2) - \sin(LAT1) \cdot \cos(C)]}{\cos(LAT1) \cdot \sin(C)}$$

and:

$$\text{Angle}(D) = \frac{\text{inverse } \cos[\sin(LAT2) - \sin(LAT1)\cos(C)]}{\cos(LAT1) \cdot \sin(C)}.$$

However, if LONG 2 is greater than LONG 1, then angle (D) = − angle (D).

After determination of the true bearing from the VOR station to each of the checkpoints, it is then determined, as previously discussed, between which set of adjacent checkpoints the selected VOR radial lies by comparing the true bearing of the selected VOR radial with the true bearings of each adjacent set of guidepoints, identified as I and I+1 respectively in FIGS. 9A and 9B.

Figure 11:
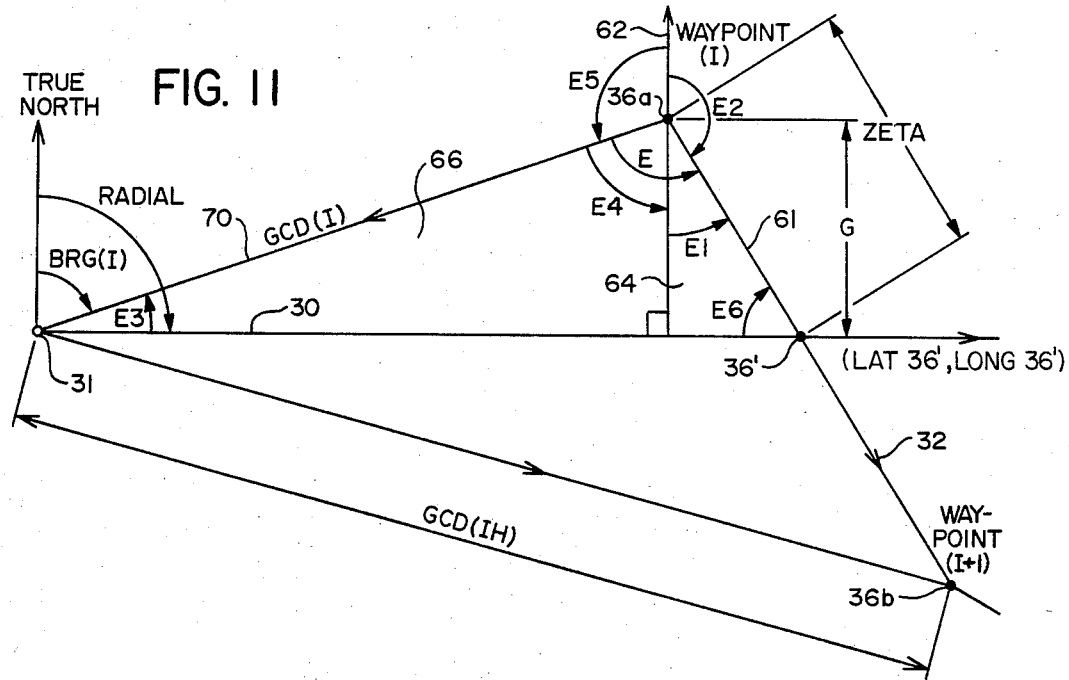
FIG. 11 is a diagrammatic representation defining various distance and angular relationships of two separate guidepoints and a NAVAID for determining the location of a navigational guidepoint in accordance with the method described in FIGS. 9A and 9B.

Once the guidepoints 36 which are adjacent to new guidepoint 36' have been determined, the geographic location of guidepoint 36' is determined by calculation of the great circle distance and true bearing from one of the adjacent guidepoints 36 to guidepoint 36'. Referring now to FIG. 11, there is shown a geometric representation of two guidepoints 36a, 36b and a NAVAID 31, the geographical locations of which are typically preprogrammed into computer 10 as part of the active flight plan route; flight path leg 32 connecting guidepoints 36a, 36b. Selected VOR radial 30 intersects flight path leg 32 to create new guidepoint 36' at the intersection thereof. In order to determine the place-bearing-distance of guidepoint 36' from NAVAID 31 for display on HSI screen 17 and at CDU window 20 (FIG. 1), a great circle distance, identified as ZETA, defining the distance between guidepoint 36a and guidepoint 36', together with the true bearing of guidepoint 36' from guidepoint 36a, are determined.

In order to determine distance ZETA which comprises a line segment 61 between guidepoint 36' and guidepoint 36a, a true north reference line 62 intersects guidepoint 36a and selected radial 30 to form two right triangles 64 and 66; reference line 62 intersecting VOR radial 30 at a point where reference line 62 is perpendicular to selected radial 30. Reference line 62 defines a distance G between guidepoint 36a and selected radial 30. Referring first to triangle 64, there is included an angle E1 formed by the intersection of flight path segment 61 and true north reference line 62. By trigonometry, ZETA=G/cos (C1), distance G and angle E1 to be determined in the following manner. An angle D representing the true bearing of guidepoint 36' from guidepoint 36a is formed by the intersection of flight path leg 32 with true north reference line 62. Referring now to triangle 66, hypotenuse 70 thereof represents the great circle distance between VOR station 31 and guidepoint 36a, a distance determined in a manner discussed in Derivation No. I. An angle E3 is formed by the intersection of selected radial 30 and hypotenuse 70. An angle E4 is formed by intersection of hypotenuse 70 and true north reference line 62. An angle E5 comprises the supplement of angle E4. An angle E is formed by the intersection of hypotenuse 70 and flight path leg 32. Distance G therefore is determined by multiplying the great circle distance between NAVAID 31 and guidepoint 36a [GCD(I)] by sin (E3), (E3) representing the angle between the true bearing of selected radial 30 and the true bearing of guidepoint 36a, the true bearing of guidepoint 36a having been determined previously.

In order to determine angle E1 of triangle 64:

E1=absolute value of (angle E—angle E4)

Angle $E =$ absolute value of (the true bearing of NAVAID 31 from guidepoint 36a minus angle $D$);

The true bearing of NAVAID 31 from guidepoint 36a is determined by the equation derived in Derivation No. 1. Angle D is the true bearing of guidepoint 36b from 36a, angle D determined by the equation derived in Derivation No. I.

It should be appreciated that other trigonometric relationships may be used to compute distance ZETA. For example in triangle 66, G=GCD(I)·cos (E4), therefore, by substitution ZETA=GCD(I)·cos (E4)/cos (E1). Also, in triangle 64, ZETA=G/sin (E6); E6 identifying an angle of triangle 64 formed by the intersection of flight path 32 and selected radial 30. The present invention includes all other equivalent methods of determining distance ZETA using known trigonometric relationships.

In order to calculate the latitude and longitude of guidepoint 36' utilizing a known distance (ZETA) and true bearing (angle D) of guidepoint 36' from guidepoint 36a, a known latitude and longitude, the following derivation is used.

DERIVATION II

Referring to FIGS. 10, the law of cosines for sides of oblique spherical triangles states that:

$$\cos (C) = \cos (A) \cdot \cos (B) + \sin (A) \cdot \sin (B) \cdot \cos (D)$$

wherein $C$=the angular distance between guidepoints 36a and 36' which is equal to the great circle distance (ZETA) between guidepoints 36a, 36' divided by the radius of the earth (Re); and D=true bearing of guidepoint 36b from 36a (See *CRC Standard Mathematical Tables*, CRC Publications, 1967, p. 162). Since sin $(90-\theta)=\cos(\theta)+\cos(90-\theta)+\cos(90-\theta)=\sin\theta$, by substitution:

$$\sin (\text{LAT } 36') = \sin (\text{LAT } 1) \cdot \cos (\text{ZETA/Re}) + \cos (\text{LAT } 1) \cdot \sin (\text{ZETA/Re}) \cdot \cos(D)$$

Therefore:

$$\text{LAT } 36' = \text{inverse sin } [\sin (\text{LAT } 1) \cdot \cos (\text{ZETA/Re}) + \cos (\text{LAT } 1) \cdot \sin (\text{ZETA/Re}) \cdot \cos (D)].$$

From the law of cosines for sides of oblique spherical triangles:

$$\cos(C) = \cos(90 - LAT\,1) \cdot \cos(90 - LAT\,36') +$$
$$\sin(90 - LAT\,1) \cdot \sin(90 - LAT\,36') \cdot$$
$$\cos(\Delta\,LONG)$$

wherein:

$\Delta\text{LONG}$=absolute value of (LONG 1−LONG 36')

Therefore:

$$\Delta\text{LONG}=\text{inverse cose } [\cos (C) - \sin (\text{LAT } \mp') + \sin (\text{LAT } 1)] / \cos (\text{LAT } 1) \cdot \cos (\text{LAT } 36\,')].$$

If angle C is between 0° and 179°, then $\Delta$LONG 36'=LONG 1−$\Delta$LONG, otherwise LONG 36'=LONG 1+$\Delta$LONG.

After determination of the latitude and longitude of guidepoint 36', the place-bearing-distance of guidepoint 36' relative to NAVAID 31 is determined by utilization of the equation derived in Derivation I for determining the great circle distance and true bearing between two geographical locations, each geographical location having a known latitude/longitude. The place-bearing-distance data pertaining to guidepoint 36' is then formatted for display on HSI CRT 17 and CDU display window 20.

CREATION OF CIRCULAR DISPLAYS REPRESENTING SELECTED DISTANCES FROM A SELECTED GEOGRAPHICAL LOCATION

In another embodiment of the present invention there is shown in FIG. 12, CRT 17 of HSI 14 wherein there are displayed distance circles 70 representing aircrew selected distance (DME DIS), from a selected geographical location identified as FIX 71, which are input to computer 10 by the aircrew at CDU keypad 18 on the CDU FIX page. Also displayed at CRT 17 is aircraft 34 and flight path 32, which includes FIX 71 as a navigational point along flight path 32, as well as an alphanumerical display of the distance represented by circle 70 and other desired data such as altitude requirements. The conventional aircraft navigational system described previously and utilized on Boeing 757/767 commercial aircraft, has the capacity for displaying an arcuate flight path at CRT 17. These arcuate flight paths have been displayed in conjunction with straight lines to portray the aircraft projected route of flight including (i) an aircraft holding pattern which is typically a "racetrack" type of pattern which the aircraft flies while awaiting clearance by air traffic control (ATC) to an approach for landing, (ii) an arcing approach which requires the aircraft to fly an arcuate path to place the aircraft in position for landing, and (iii) a transition between two flight legs representing different courses wherein an arcuate path is used to connect the flight legs to provide a transition path for the aircraft to fly.

In the conventional navigation system, an arcuate flight path was located and displayed at CRT 17 by providing to computer 10 the latitude and longitude of the starting point of the arcuate flight path and the ending point of the arcuate flight path, respectively, as well as the radius of the arc, the value of the angle which the arcuate path subtended between the starting and ending points, and the initial course of the arcuate path, which is defined as the initial direction of the arcuate path from the starting point relative to true north. A positive value for the subtended angle results in the arc being drawn in a clockwise direction; a negative value for the subtended angle results in the arc being drawn in a counterclockwise direction. The initial course is dependent upon the location of the starting point relative to the center of the circle. For example, when the starting point bears 270° from the center of the circle, i.e., to the left of the center, the initial course from the starting point is north or 0°.

In the present invention, however, it has been recognized that the display of selected circle 70 cartographically, as illustrated in FIG. 12, wherein the radius thereof represents a selected distance from FIX 71 provides the aircrew with a visual display of distance information relative to the aircraft and flight path. FIX 71 may be a NAVAID defined by the latitude/longitude thereof, a GRP defined by the latitude/longitude thereof and given an identifier such as "BOY" for access via CDU keypad 18 by the identifier, or an SRP defined by the latitude/longitude thereof and entered via keypad 18 as a latitude/longitude. Sometimes clearance is given by air traffic control (ATC) utilizing DME distances and altitude clearance limits that are independent of identified geographic locations. For example, a typical ATC clearance prior to a landing approach might read "expect clearance to 15,000 feet at 55 DME (from, for example, the Seattle VOR), and expect further clearance upon crossing the 30 nautical mile at 13,000 feet descending to 10,000 feet". As far as Applicants are aware, conventional systems provide no visual cartographic display of these DME distances in reference to the aircraft's position and projected flight path. It can be appreciated however, that the display of selected circle 70 may be utilized to provide the aircrew with the knowledge of the aircraft's position relative to the DME distances specified in the ATC clearances so that the aircrew is prepared for the altitude change instructions.

In accordance with the present invention, the aircrew enters a selected distance in a required format via CDU keypad 18 at the CDU FIX page, where it is displayed alphanumerically as a selected distance from FIX 71. The distance data is transmitted to computer 10 which recognizes the circle format causing computer 10 and symbol generator 16 to display selected circle 70 at CRT screen 17 in a manner to be described hereinafter. As the aircraft 34 progresses along flight path 32, circle 70 and FIX 71 move in a downward direction relative to CRT 17 and aircraft symbol 34. When aircraft symbol 34 intersects with circle 70, the pilot is able to ascertain that the aircraft is at the selected distance identified in the ATC instructions, in preparation for the further altitude clearance instructions forthcoming from ATC.

Figure 13:
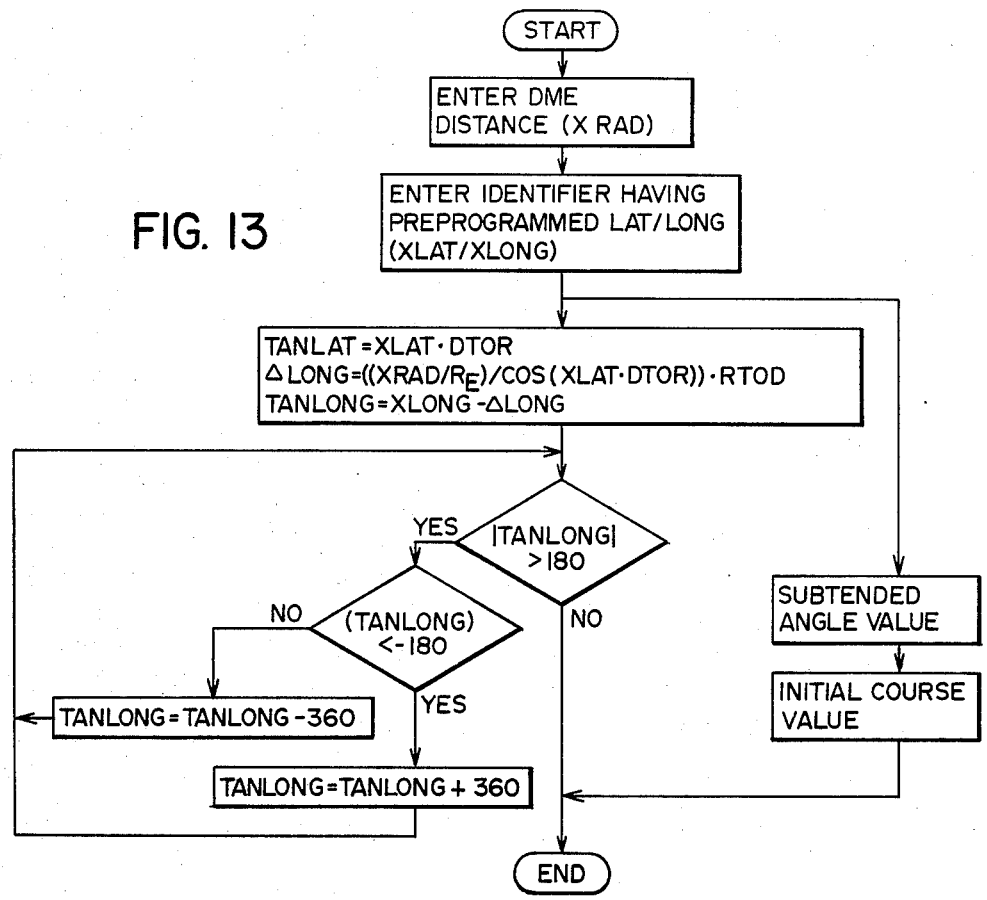
FIG. 13 is a flow chart of the method of creating a circle display.

Location and display of selected circle 70 is accomplished utilizing the aircraft navigational system described previously on board Boeing 757/767 aircraft, and by referring to the flow chart in FIG. 13. A selected geographical location having a preprogrammed latitude/longitude (XLAT/XLONG) or a selected NAVAID 31 identifier, having a preprogrammed latitude/longitude (XLAT/XLONG), together with a numerical value of the selected distance (XRAD) are entered into computer 10 at keypad 18 (FIG. 1). The latitude and longitude of a tangent point (TANLAT/TANLONG) to a circle having a centerpoint (XLAT/XLONG) and a radius equal to the selected distance (XRAD) is determined by selecting TANLAT to have a latitude equal to that of XLAT, and then converting this latitude into radians. TANLONG is determined by the equation:

$$TANLONG = XLONG - \Delta LONG$$

wherein:

$$\Delta LONG = (XRAD/Re)/\cos(XLAT \cdot DTOR) \cdot RTOD$$

wherein:
Re = radius of earth,
DTOR = degrees to radians conversion constant,
RTOD = radians to degrees conversion constant.
$-180° \leq TANLONG \leq 180°$.

In order that the value of TANLONG remains greater than or equal to minus 180, and less than or equal to plus 180, the following procedure is utilized. If the absolute value of TANLONG is greater than plus 180, then TANLONG equals TANLONG minus 360. If the absolute value of TANLONG is less than minus 180, then TANLONG equals TANLONG plus 360.

The latitude and longitude of the tangent point (TANLAT/TANLONG) is utilized as a starting latitude/longitude and an ending latitude/longitude for creation of circle 70. A subtended angle value of either +360° or −360° is preprogrammed into computer 10 unless a value of 360° is equated to 0° by computer 10, wherein a value less than 360° but substantially equal to 360°, such as 359.9°, is used. An initial course of 0° is preprogrammed into computer 10 for establishing the initial course for the creation of circle 70 when TANLAT is selected to have a latitude equal to XLAT and when the subtended angle is programmed as a positive value. An initial course of 180° is preprogrammed into computer 10 for establishing the initial course for creation of circle 70 when TANLAT is selected to have a latitude equal to XLAT and when the subtended angle is programmed as a negative value.

CREATION OF NAVIGATIONAL GUIDEPOINTS AT THE INTERSECTION OF THE TRACK LINE WITH ONE OR MORE SELECTED DISTANCES

In another embodiment of the present invention illustrated in FIG. 14, there is shown a representation wherein one or more guidepoints 36" are created at the intersection of a selected distance, represented by a circle 70, with the aircraft projected flight path 32. The representation, displayed at CRT 17 of HSI 14, includes flight path 32, aircraft symbol 34, selected geographical FIX 71 and distance circle 70, representing the selected distance (DME DIS) from FIX 71. As discussed previously, DME DIS is input to computer 10 by the pilot at the CDU FIX page to create a place-bearing-distance, which is then transferred to the CDU scratchpad, line selected to the proper location at the CDU LEGS page and displayed at CRT 17. Simultaneously with the display of the above navigational data cartographically at HSI CRT 17, data defining FIX 71, guidepoints 36" and the selected distance is displayed at CDU window 20 (FIG. 1) in an alphanumeric format. It should be appreciated that creation of guidepoints 36" does not require the display of the selected distance as selected circle 70 at CRT 17; however, the display of selected circle 70 and flight path leg 32 provides the aircrew with immediate visual feedback of the intersection point prior to transferring the PBD data to the LEGS page and displaying the PBD data as a newly created guidepoint.

It should be appreciated that the creation of navigational guidepoints at the intersection of the aircraft projected flight path of one or more selected distances is a rapid method of creating navigational guidepoints not available in conventional aircraft navigational systems. For example, an aircrew without the benefit of distance circle display 70 described previously receives a clearance from air traffic control to descend to 10,000 feet at 30 mile DME inbound to the Seattle VOR (FIX 71 in FIG. 14). The aircrew enters the selected DME distance via CDU keypad 18 in a required format at the CDU FIX page. The DME distance data is transmitted to computer 10 which utilizes the DME distance data, together with the geographical locations of NAV-AIDS, GRPs and SRPs defining the projected route of flight, to determine the geographical location of the point of intersection in a manner to be described hereinafter. The point of intersection is displayed at the CDU FIX page as an alphanumeric bearing and distance, which is transferred to the LEGS page and line selected by the aircrew into the CDU scratch pad, moved to the LEGS page which the geographical guidepoints defining the route of flight are located, and entered as a new guidepoint in the flight plan. A track line 32" connecting guidepoint 36" to aircraft symbol 34 and to subsequent guidepoints 36, is displayed at CRT 17 to provide a visual path for the aircrew to monitor when navigating in reference to new guidepoint 36". The point of intersection is displayed as a new guidepoint 36" which moves in a downward direction on CRT 17 relative to aircraft symbol 34 to provide a visual indication to the aircrew when the required descent to 10,000 feet is to be made.

Figure 15:
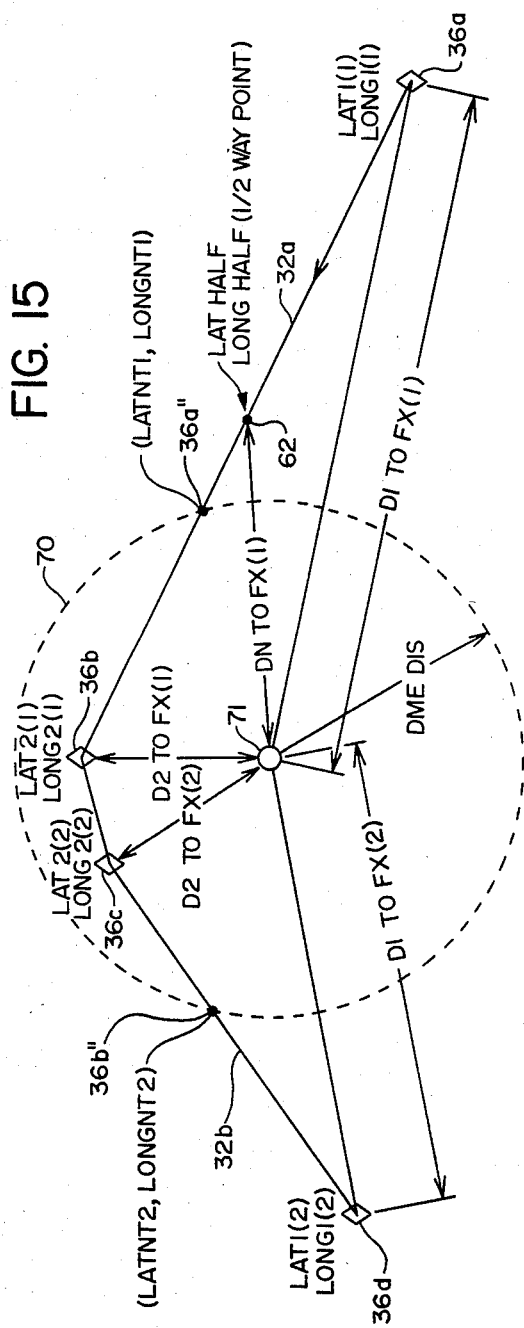
FIG. 15 is a diagrammatic representation defining various distance relationships for determining the locations of navigational guidepoints created by the intersection of a DME distance with the aircraft projected flight path.

There is shown in FIG. 15 two sets of guidepoints; guidepoints 36a, 36b, identified as LAT 1 (1)/LONG 1 (1), LAT 2 (1)/LONG 2 (1) respectively, defining a flight path 32a which intersects the selected DME distance, represented by circle 70, on an inbound flight leg, and guidepoints 36c, 36d which are identified as LAT 2 (2)/LONG 2 (2), LAT 1 (2)/LONG 1 (2) respectively, defining flight path leg 32b which intersects the selected DME distance on an outbound flight path leg. An "inbound leg" is defined as a flight path leg wherein the distance between flight path 32 and FIX 71 decreases as the aircraft travels along flight path 32; an "outbound leg" defined as a flight path leg wherein the distance between flight path 32 and FIX 71 increases as the aircraft travels along flight path 32.

Figure 16:
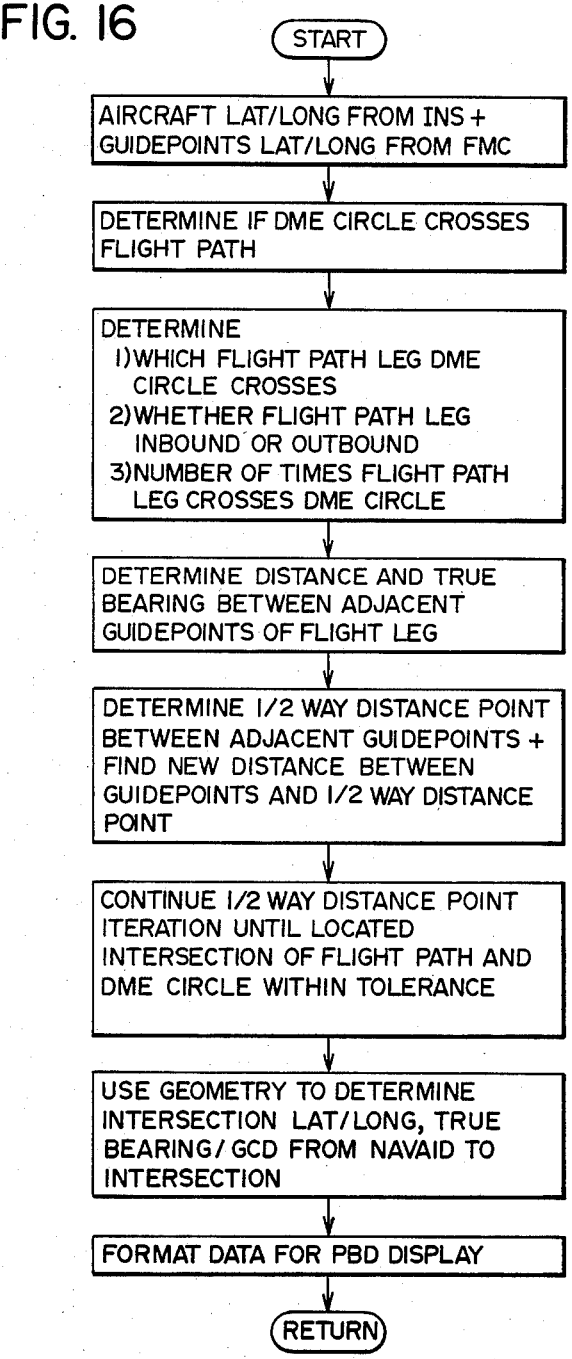
FIG. 16 is a flow chart broadly describing a method of determining aircraft navigational guidepoints by intersection of the aircraft projected flight path with a pilot selected DME distance.

Referring now to FIG. 16 there is shown a flow chart describing an overview of a method of the present invention for the creation of guidepoints 36a", 36b" (FIG. 15). Initially the latitude/longitude of each guidepoint of the active flight plan is retrieved from the data base of flight management computer 10. The latitude and longitude of the aircraft is retrieved from the aircraft's inertial guidance system. After accessing FIX 71, the pilot inputs a selected distance into computer 10 at the FIX page of CDU keypad 18. Computer 10 then determines: (1) whether or not the selected distance intersects the projected flight path, (2) which flight path leg the selected distance intersects, and (3) whether the flight path leg is inbound or outbound relative to the FIX 71.

Using spherical geometry, the distance and true bearing between adjacent checkpoints comprising guidepoints 36, destination 38 and aircraft location defined by aircraft symbol 34, is determined to define the intersected flight path leg. In order to approximate the intersection point of the selected distance with the projected flight path, a halfway distance point between adjacent checkpoints which define the intersected flight path leg is determined, this halfway point designated as a temporary guidepoint identified as LATHALF/LONGHALF (FIG. 15). The distance between the temporary guidepoint and one of the adjacent guidepoints is again halved, the new halfway point again defining a temporary guidepoint. This halving iteration continues until the intersection point comprising the newly created guidepoint is located within a predetermined tolerance. The intersection point latitude/longitude and true bearing/GCD from the FIX to the newly created guidepoint is then determined using spherical geometry, the result formatted as a place-bearing-distance for display at CDU window 20 and at CRT 17.

Figure 17A:
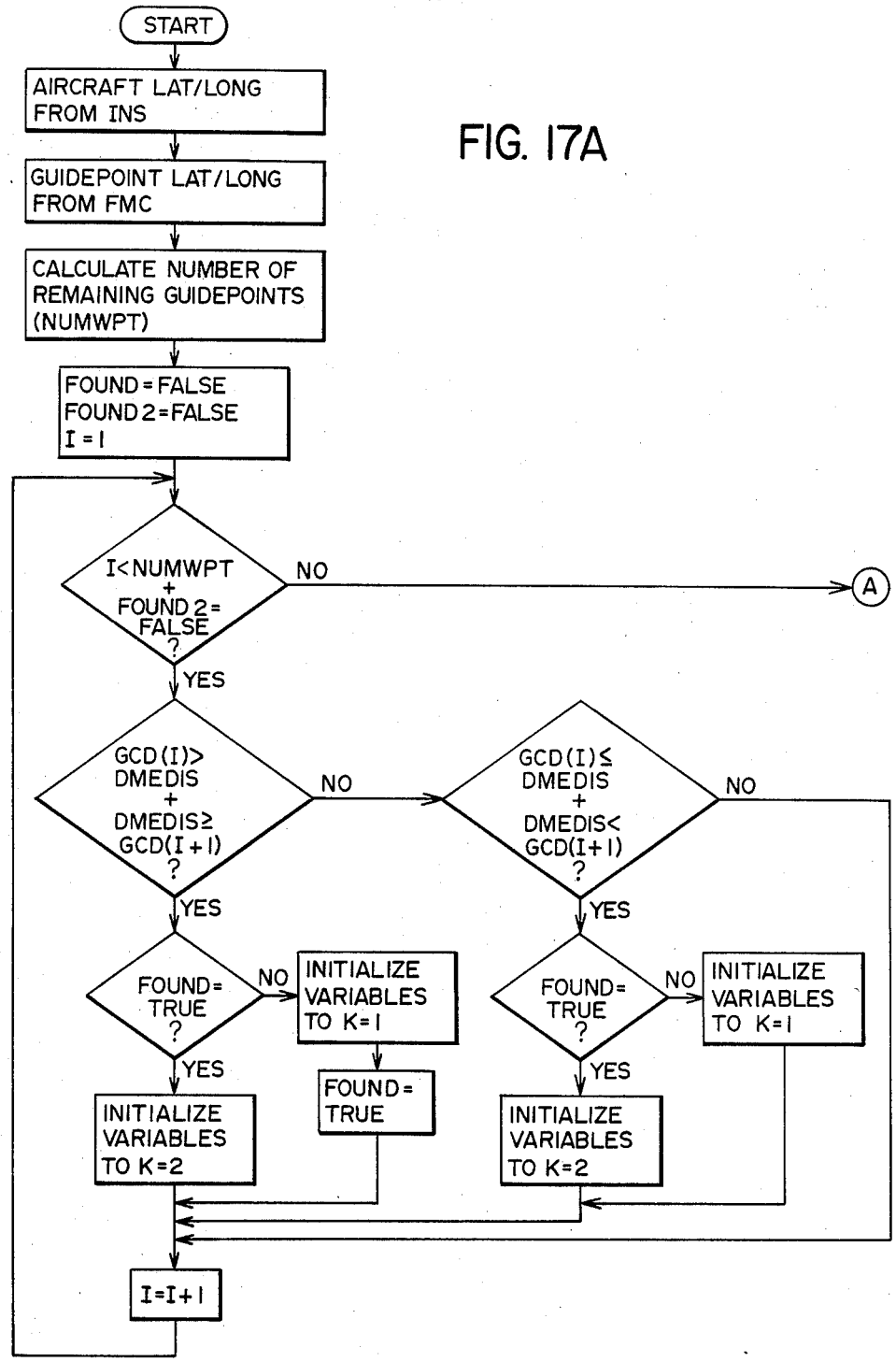
FIGS. 17A and 17B is a detailed flow chart describing the method of determining aircraft navigational guidepoints disclosed in FIG. 16.
Figure 17B:
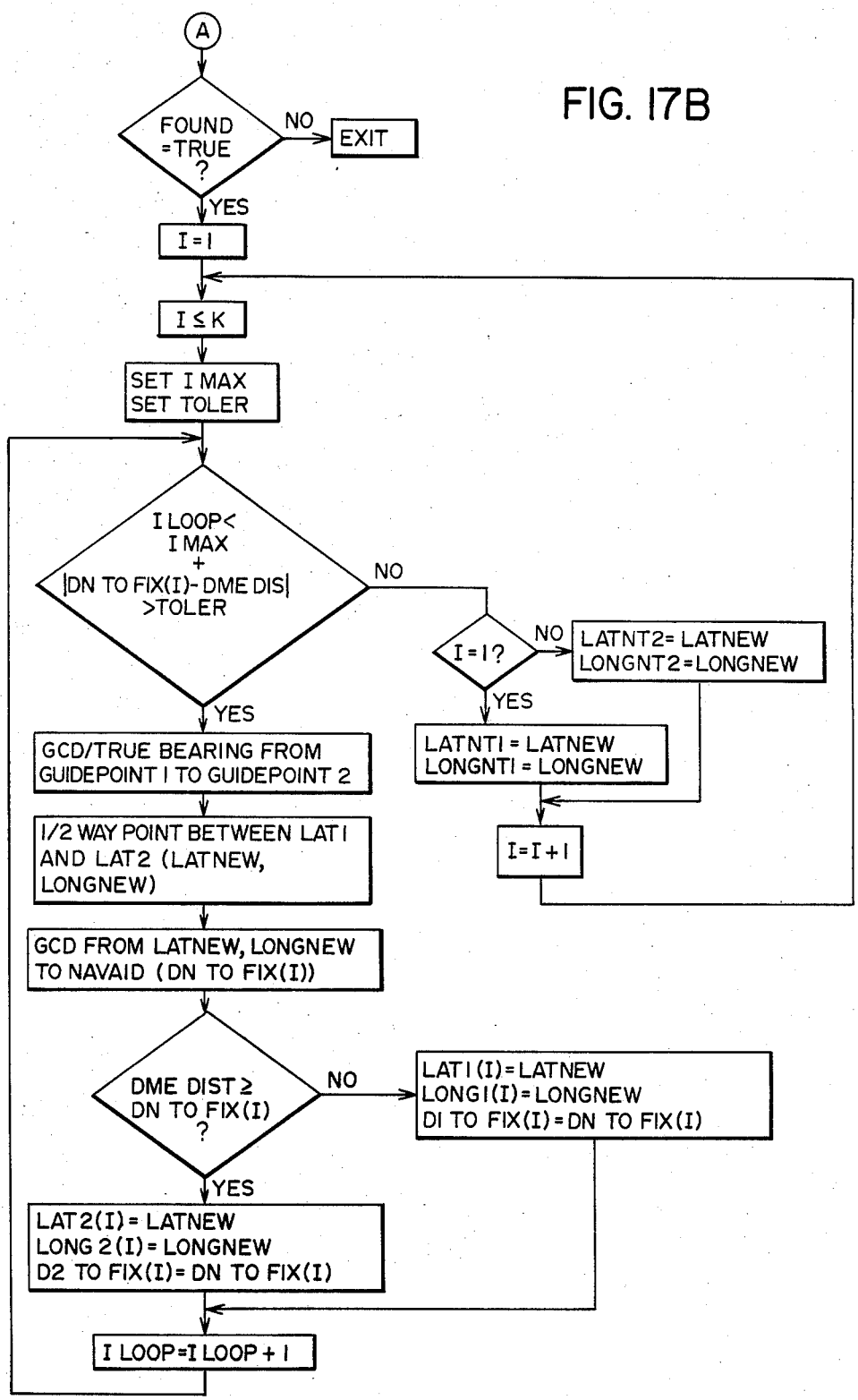

A more detailed description of the present embodiment is provided by referring to the flow chart in FIGS. 17A and 17B wherein after calculation of the number of remaining checkpoints, the great circle distance from FIX 71 to each set of adjacent checkpoints is compared with the selected distance to determine through which flight path leg 32 or flight path legs 32a, 32b the selected distance (DME DIS) intersects, as shown in FIG. 18. The numerical value of the selected DME distance is located between the numerical values of the distances from FIX 71 to the set of adjacent checkpoints which define intersected flight path 32a. Once the adjacent guidepoints which define the intersected flight path leg have been determined, the geographical location of the intersection point comprising new guidepoint 36a" is determined. In order to provide a geometric description for determination of guidepoint 36a", reference is made to FIG. 15 wherein the great-circle distance from FIX 71 to guidepoints 36a, 36b, 36c, 36d is identified as D1 to FX (1), D2 to FX (1), D2 to FX (2), and D1 to FX (2) respectively. A halfway point 62 is located equidistant from guidepoints 36a" and 36b". Using the equation derived in Derivation No. I for determining the great circle distance and true bearing between two guidepoints identified by known latitude/longitude, the great circle distance between guidepoints 36a and 36b is calculated and then divided in half to determine the GCD to midpoint 62. Using the equation derived in Derivation No. II for determining the latitude/longitude of a second location using the GCD and true bearing of the second location from a first location having a known latitude/longitude, the latitude and longitude of halfway point 62 is determined. Utilizing the latitude/longitude of FIX 71 and halfway point 62 respectively, the great circle distance from halfway point 62 to FIX 71 (DN to FX (1)) is determined, and then compared with the selected DME distance (DME DIS) to determine through which segment of flight path leg 32 the DME radius intersects; the flight path segments defined by LAT 1 (1)/LONG 1 (1), LATHALF/LONGHALF and LAT 2 (1)/LONG 2 (1), LATHALF/LONGHALF respectively. For example, if DN to FX (1)=10 miles, D2 to FX (1)=5 miles and DME DIS=7 miles, then the segment of flight path leg 32a defined by LAT 2 (1)/LONG 2 (1) and LATHALF/LONGHALF intersects the selected DME distance. The latitude/longitude of LATHALF/LONGHALF is determined using the equation derived in Derivation No. II.

The determination of the geographic location of guidepoint 36a" continues by dividing the distance between LAT 2 (1)/LONG 2 (1) and LATHALF/LONGHALF in half to create two new flight path segments, comparison is then made between a new DN to FX (1) and DME DIS to determine through which of these new flight path segments the DME distance intersects. These successive calculations using increasingly smaller flight path segments continue until the tolerance limits (DN to FX (1)—DME DIS) are reached, resulting in a close approximation of the latitude and longitude of guidepoint 36a" utilizing the equation derived in Derivation No. II; from which the great circle distance and true bearing of guidepoint 36a" from FIX 71 is determined utilizing the equation derived in Derivation No. I for determining the great circle distance and true bearing between two geographical locations defined by the respective latitude/longitude. The results are automatically entered into the temporary memory of computer 10 and then formatted for display as a place-bearing-distance on the FIX page of CDU 12, and then line selected into the CDU scratchpad, moved to the LEGS page, and entered as a new guidepoint 36a" in the flight plan.

CREATION OF NAVIGATIONAL GUIDEPOINTS AT THE INTERSECTION OF ONE OR MORE SELECTED RADIALS WITH ONE OR MORE SELECTED DISTANCES

In another embodiment of the present invention shown in FIG. 19, there is provided a map mode representation wherein new guidepoints 36''' are created at the intersection of one or more selected radials and one or more selected distances from a selected geographical location. Waypoints 36''' are created and displayed independently of selected guidepoints 36 and track line 32 therebetween. The representation, displayed in the map mode at CRT 17, includes FIX 71, DME circle 70, a radial 74, aircraft symbol 34 and flight path 32. As discussed previously, FIX 71 may comprise (i) a VOR NAVAID, (ii) a geographical reference point (GRP) defined as a latitude/longitude given a named identifier and preprogrammed into computer 10, or (iii) a selected reference point (SRP) defined as a geographical location entered via keypad 18 as a latitude/longitude. Radial 74 may comprise a pilot selected VOR radial entered via VOR receiver 22 when FIX 71 comprises a VOR NAVAID; or radial 74 may comprise a pilot selected radial entered as a bearing from a selected GRP or SRP. The intersection of the selected distance, represented by circle 70, with radial 74 defines place-bearing-distance data which is displayed at the FIX page of CDU 12. Radial 74 and circle 70 are referenced to a common FIX 71, with radial 74 defining the bearing from FIX 71 and circle 70 defining the distance from FIX 71. The PBD data is line selected to the proper location on the LEGS page and then displayed as guidepoint symbol 36''' at CRT 17 and as alphanumeric data at CDU window 20 a track line 32''' connecting new guidepoint 36''' to aircraft symbol 34 by and to subsequent guidepoints 36 is displayed at CRT 17 to provide a visual path for the aircrew to monitor when navigating in reference to new guidepoint 36'''.

It should be appreciated that the present invention is not limited to the particular embodiments disclosed herein. It should be readily apparent that modifications of the present methods without departing from the spirit and scope of the invention can be made. For example, embodiments disclosed herein may be combined for display simultaneously or for display in various combinations depending upon pilot preference and projected flight path route restrictions.

What is claimed is:
1. An aircraft navigational system comprising:
   a. receiver means for
      1. receiving electronic navigational signals from a selected navigational station, and
      2. for outputting a navigational signal defining a first selected navigational radial of the selected navigational station;
   b. computer means, including a memory, responsive to said first navigational signal and arranged to:
      1. provide a first informational signal indicating geographical locations of a plurality of selected guidepoints which define a navigational route;
      2. respond to said first navigational signal and to provide a second informational signal indicating a first point of intersection of said navigational route with said first navigational radial to define the geographical location of a first new guidepoint;
      3. determine the geographical location of said first guidepoint by
         (i) determining the position of said selected navigational radial between two of said selected guidepoints, and
         (ii) measuring a distance along said navigational route between said navigational radial and at least one of said two selected guidepoints; and
      4. storing data defining the geographical location of said first guidepoint in said memory.

2. The aircraft navigational system as recited in claim 1 additionally comprising:
   a. input means:
      1. for entering information defining a second selected navitgational radial from a selected geographical fix, and
      2. for ouputting a second navigational signal defining said second selected navigational radial, said computer means arranged to respond to said second navigational signal and to provide a third informational signal indicating a second point of intersection of said navigational route with said second navigational radial to define a second new guidepoint, said computer means storing data defining said second new guidepoint in said memory.
3. The aircraft navigational system as recited in claim 2 additionally comprising informational display means responsive to said first, second and third informational signals to provide an informational display of the geographic locations of said selected guidepoints, said first point of intersection, said second point of intersection and said aircraft.
4. The aircraft navigational system of claim 3 wherein said informational display means is arranged to provide an informational display of said selected guidepoints and said first and second points of intersection moving relative to said informational display of said aircraft.
5. The aircraft navigational system of claim 3, wherein said informational display means additionally provides an informational display of the geographic locations of said navigational route, said first selected radial, and said second selected radial.
6. The aircraft navigational system as recited in claim 2 wherein said input means comprises means for manually entering said information in an alphanumerical format.
7. The aircraft navigational system as recited in claim 3 wherein said data is displayed as symbols on a cartographic display.
8. The aircraft navigational system as recited in claim 3 wherein said data is displayed alphanumerically.
9. The aircraft navigational system as recited in claim 1 wherein said receiver means comprises a VOR navigational device having switching means for manually selecting to receive (i) signals from a VOR navigational station and (ii) signals defining a selected navigational radial of said VOR station.
10. The aircraft navigational system as recited in claim 1 additionally comprising informational display means responsive to said first and second informational signals to provide an informational display of data for navigating relative to said first guidepoint.
11. The aircraft navigational system as recited in claim 1 wherein the geographical location of said first new guidepoint is determined by:
   a. determining respective bearings of each of said selected guidepoints from said selected navigational station; and
   b. comparing the bearing of said first navigational radial with the bearings of said selected guidepoints to locate the position of said first navigational radial between said two selected guidepoints.
12. The aircraft navigational system as recited in claim 11 wherein:
   a. said two selected guidepoints are defined by a first reference guidepoint and a second reference guidepoint; and
   b. the bearing of said first point intersection from one of said two selected guidepoints is determined by the equation:

Bearing = inverse $\cos(\sin(LAT\,2) - \sin(LAT\,1)\cos(C))/$ $\cos(LAT\,1)\sin(C)$ wherein LAT 2=latitude of said second reference guidepoint, LAT 1=latitude of said first reference guidepoint and C=an angle formed by the intersection of two lines which respectively connect said first reference guidepoint and said second reference guidepoint to the center of the earth.

13. The aircraft navigation system as recited in claim 12 wherein said distance between said first navigational radial and at least one of said two guidepoints is determined by:
   a. forming a first triangle having a first side comprising said selected navigational radial, a second side connecting said navigational station to said selected one guidepoint, and a third side connecting said selected one guidepoint with said selected radial in a manner that the third side is located perpendicularly to said selected navigational radial, and a second triangle having a first side comprising said selected navigational radial, a second side connecting said selected navigational radial at said point of intersection to said selected one guidepoint and a third side in common with the third side of said first triangle;
   b. formulating a first equation and variables representing the sides of said first triangle and representing angles formed by the intersections of said first triangle sides, to define the length of said third side of said first triangle, and a second equation of variables representing the sides of said second triangle and representing angles formed by the intersections of said second triangle sides, to define the length of said third side of said second triangle; and
   c. solving for the length of said second side of said second triangle in terms of the variables of said first triangle and said second triangle.
14. The aircraft navigational system as recited in claim 13 wherein said computer means determines the geographical location of said first guidepoint in degrees of latitude and longitude by:
   a. calculating the latitude of said point of intersection by the equation:

Latitude = inverse $\sin(\sin(LAT\,1)$ $\cos(ZETA/Re) + \cos(LAT\,1)$ $\sin(ZETA/Re)\cos(D))$ wherein ZETA=the distance between said point of intersection and said selected one reference guidepoint, Re=radius of earth, LAT 1=latitude of said first selected reference guidepoint, and D=bearing of said point of inersection from said first selected reference guidepoint; and
   b. calculating the longitude of said point of intersection by the equation:

Longitude = $LONG\,1$ − ((inverse

-continued
$$\cos(\cos(C) - \sin(LAT\ 36') + \sin(LAT\ 1))))/\cos(LAT\ 1)\cos(LAT\ 36')$$

when C is from 0° to 179°; and $$\text{Longitude} = LONG\ 1 + ((\text{inverse}$$

$$\cos(\cos(C) - \sin(LAT\ 36') + \sin(LAT\ 1))))/\cos(LAT\ 1)\cos(LAT\ 36')$$

when C is from 179° to 360°;
wherein C=an angle formed by the intersection of two lines which respectively connect said first reference guidepoint and said point of intersection to the center of the earth, LAT 1=the latitude of said first reference guidepoint, LAT 36'=latitude of said point of intersection, and LONG 1=the longitude of said first reference guidepoint.

15. The aircraft navigational system as recited in claim 14 wherein:
   a. said computer means determines the bearing of said point of intersection from said navigational station by the equation:

$$\text{Bearing} = \text{inverse cos (sin (LAT 36')} - \text{sin (LAT 1)} \cos (C)/\cos (LAT\ 1) \sin (C)$$

wherein LAT 36'=latitude of said point of intersection, LAT 1=latitude of said navigational station, and C=an angle formed by the intersection of two lines which respectively connect said point of intersection and said navigational station to the center of the earth; and
   b. said computer means determines the distance between said point of intersection and said navigational station by the equation:

$$\text{Distance} = \text{inverse}$$
   $$\cos(\cos(90 - (LAT\ 36')\cos(90 - LAT\ 1 +$$
   $$\sin(90 - (LAT\ 36')\sin(90 - LAT\ 1)$$
   $$\sin(90\ LAT\ 2)\cos(\text{absolute value of}$$
   $$LONG\ 1 - LONG\ 2))) \cdot Re$$

wherein Re=radius of the earth, LAT 36'=latitude of said point of intersection, LAT 1=latitude of said navigational station, LONG 36'=longitude of said point of intersection, and LONG 1=longitude of said navigational station.

16. An aircraft navigational system comprising:
   a. input means:
      1. for entering information defining a selected distance from a selected geographical fix, and
      2. for outputting a navigational distance signal defining said selected distance from said selected geographical fix;
   b. computer means, including a memory, responsive to said navigational distance signal and arranged to:
      1. provide a first informational signal indicating geographical locations of a plurality of predetermined selected guidepoints which define a navigational route, and
      2. respond to said navigational distance signal and to provide a second informational signal indicating a point of intersection of said navigational route with a navigational point which is located from said selected geographical fix at said selected distance in order to define a new guidepoint at said point of intersection, and
      3. store data defining the geographical location of said new guidepoint in said memory.

17. The aircraft navigational system as recited in claim 16 additionally comprising informational display means responsive to said first and second informational signals to provide an informational display of data for navigating relative to said new guidepoint.

18. The aircraft navigational system as set forth in claim 17 wherein:
   a. the selected distance is displayed as an arc centered at the geographical fix; and
   b. the navigational route is displayed as a line; and
   c. the point of intersection is displayed by the intersection of the line and the arc.

19. The aircraft navigational system as recited in claim 16 wherein said input means comprises means for manually entering said information in an alphanumerical format.

20. The aircraft navigational system as recited in claim 16 additionally comprising informational display means responsive to said first and second information signals to provide an informational display of said geographic locations of said selected guidepoints, said point of intersection, and said aircraft.

21. The aircraft navigational system as recited in claim 20 where said informational display means additionally provides an informational display of the geographical locations of said navigational route, said selected geographical fix, and said navigational point.

22. The aircraft navigational system as recited in claim 21 wherein said informational display means displays said geographic locations in an alphanumerically format.

23. The aircraft navigational system as recited in claim 21 wherein said information display means displays said geographical locations of said aircraft, said selected guidepoints, said navigational route, point of intersection, said selected geographic fix, and said navigational point as symbols on a cartographic display.

24. The aircraft navigational system as recited in claim 21 wherein said selected distance is displayed as a circle having a center coincident with said selected geographical fix, and a radius equal to said selected distance.

25. The aircraft navigational system as recited in claim 16 wherein:
   a. said navigationalroute includes a plurality of segments, said point of intersection located at one of said segments; and
   b. said computer means is arranged to determine the geographical location of said point of intersection between two of the selected guidepoints defining said intersected segment.

26. The navigational system as recited in claim 25 wherein said computer means compares said selected distance with distances between the selected geographical fix and said guidepoints in a manner that said two guidepoints defining said intersected segment are identified when the value of said selected distance is between the respective values of the distances from the selected geographical fix to the guidepoints defining a segment.

27. The aircraft navigational system as recited in claim 26 wherein said computer means determines the geographical location of said point of intersection by:
a. dividing the distance between said two guidepoints into two substantially equal subdivided segments;
b. determining at which of said subdivided segments said point of intersection is located;
c. dividing said intersected subdivided segment into two substantially equal subdivided segments at a middle reference point;
d. determining the distance from said middle reference point to said selected geographical location; and
e. repeating steps 32(b), 32(c) and 32(d) until the difference between the distance from said middle reference point to said selected geopgraphical location and the selected distance is within a predetermined value.

28. A method for creating an aircraft navigational guidepoint comprising the steps of:
a. establishing a plurality of navigational guide points which define a navigational route, each guidepoint defined by a known geographical location, and generating a first informational signal indicating the geographical location;
b. providing information defining at least one navigational point which is a selected distance from a selected geographic fix so as to intersect at a point of intersection a segment of the navigational route, the segment defined by two of the guidepoints, the point of intersection of the navigational point with the navigational route defining a new navigational guidepoint, and generating a second informational signal indicating the point of intersection; and
c. transmitting the first and second information signals to visual display means to provide an informational display of data for navigating relative to the new navigational guidepoint.

29. The method as recited in claim 28 wherein the geographical location of the new navigational guidepoint is determined by:
a. identifying the guidepoints which define the navigational route segment at which the point of intersection is located; and
b. determining the location of the point of intersection between the guidepoints defining the intersected navigational route segment.

30. The method as recited in claim 29 wherein the guidepoints defining the intersected navigational segment are identified by comparing the selected distance to respective distances from the selected geographical fix to the guidepoints defining a navigational segment in a manner that said two guidepoints defining the intersected segment are identified when the value of the selected distance is between the respective values of the distances from the selected geographical fix to the guidepoints defining a segment.

31. An aircraft navigational system comprising:
a. receiver means:
 1. for receiving electronic navigational signals from a selected navigational station, and
 2. for outputting a navigational radial signal defining a selected navigational radial of said navigational station;
b. input means for inputting a navigational distance defining a selected navigational distance from said navigational station and for outputting a navigational distance signal which is representative of said navigational distance;
c. computer means responsive to said navigational radial signal and to said navigational distance signal, and arranged to (i) respond to said navigational radial signal and to said navigational distance signal, and (ii) to provide an informational signal indicating a point of intersection of said navigational distance with said navigational radial to define a new guidepoint; and
d. informational display means responsive to said informational signal to provide an informational display of the geographical locations of said navigational radial, said navigational distance and said point of intersection, the geographical locations of said navigational radial, said navigational distance, and said point of intersection being displayed as symbols on a cartographic display, said navigational distance displayed as an arc having a center coincident with said navigational station and having a radius equal to said navigational distance, and said navigational radial being displayed as a line segment orginating inside said arc and intersecting said circle at said point of intersection.

32. A method for creating aircraft navigational guidepoints comprising the steps of:
a. receiving navigational signals from a selected navigational station;
b. selecting a radial of the navigational station to intersect with a selected distance from the navigational station at a point of intersection, the point of intersection of the navigational station radial with the navigational station distance defining a new navigational guidepoint, and generating an informational signal indicating the point of intersection; and
c. providing the information signal to visual display means to display the geographical locations of the navigational station radial, navigational station distance and the point of intersection as symbols on a cartographic display, the navigational distance displayed as a circle having a center coincident with the geographical location and having a radius equal to the navigational distance, and the navigational radial being displayed as a line segment originating inside said arc and intersecting said are at the point of intersection.

33. An aircraft navigational system comprising:
a. input means
 1. for manually entering information by an aircrew including (i) navigational distance data defining a selected distance from a selected geographical fix, and (ii) navigational radial data defining a selected bearing from said selected geographical fix, and
 2. for outputting a navigational distance signal defining said selected distance from said geographical fix and a navigational radial signal defining said bearing from said selected geographical fix;
b. computer means responsive to said navigational distance signal and to said navigational radial signal, and arranged to respond to said navigational radial signal and to said navigational distance signal, and to provide an informational signal indicating a point of intersection of said navigational distance with said navigational radial to define a new guidepoint; and c. informational display means responsive to said informational signal to provide an informational display of the geographical locations of said navigational radial, said navigational distance and said point of intersection, said navigational radial, said navigational distance, said navigational distance being displayed as an arc having a center coincident with said selected geographical location and having a radius equal to said navigational distance, and said navigational radial being displayed as a line segment originating within the arc and intersecting the arc at the point of intersection.

34. A method of creating aircraft navigational guidepoints comprising the steps of:
   a. providing a navigational distance signal defining a selected distance from a selected geographical fix;
   b. providing a navigational radial signal defining a selected bearing from the selected geographical fix;
   c. outputting a navigational distance signal defining the selected distance from the geographical fix and a navigational radial defining the bearing from the selected geographical fix;
   d. responding to the navigational radial signal and to the navigational distance signal, and providing and informational signal indicating a point of intersection of the navigational distance with the navigational radial to serve as a new guidepoint; and
   e. responding to the informational signal to provide a cartographic display of the geographical locations of the navigational radial, the navigational distance and the point of intersection, the navigational distance signal being displayed as a circle having a center coincident with the selected geographical fix and having a radius equal to the navigational distance, the navigational radial being displayed as a line originating within the circle and intersecting the circle at the point of intersection.

35. An aircraft navigational system for locating and displaying a circle defining a selected navigational distance from a selected geographical location, said navigational system comprising:
   a. input means
      1. for inputting said selected navigational distance from said selected geographical location, and
      2. for outputting a navigational distance signal defining said selected distance from said selected geographical location;
   b. computer means responsive to said navigational distance signal and characterized in that
      1. said computer means is predisposed to provide a first information signal indicating the geographical locations of a plurality of points forming an arcuate path which define a portion of a projected route of aircraft flight, said computer means responding to inputs, including (i) a first selected geographic locational input defining a starting point of said arcuate path, (ii) a second selected geographic locational input defining an ending point of said arcuate path, (iii) a radius input defining a radius of said arcuate path having a center coincident with said selected geographical location, (iv) a subtended angle input defining an angle subtended by said arcuate path between said starting point and said ending point, and (v) initial course input defining an initial direction of said arcuate path from said first selected geographical location, to provide said first informational signal;
      2. said computer means further comprising means to provide a second informational signal indicating the geographical locations of a plurality of points defining a circle having a center coincident with said selected geographical location, and having a radius equal to said selected navigational distance, said circle representing a constant omnidirectional distance from said selected geographical location, said computer means defining said initial course as zero when the subtended angle is a value of 360° and defining said initial course as 180° when said subtended angle is a value of −360°, said computer means responding to inputs comprising (i) a third geographical locational input defining a starting point and ending point of said circle, and (ii) a radius input defining the radius of said circle, to provide said second informational signal; and
   c. informational display means responsive to said second informational signal to provide a cartographic display of said circle.

36. The aircraft navigational system as recited in claim 35 wherein said third geographical location is defined as having a latitude equal to the latitude of said selected geographical location, and a longitude determined by the equation:

Longitude = XLONG − ΔLONG wherein:
XLONG equals the longitude of said selected geographical location and ΔLONG = (XRAD/Re)/cos(XLAT.DTOR.RTOD)

wherein:
XRAD = said selected navigational distance,
XLAT = latitude of said third geographical location,
Re = radius of earth, DTOR = a degrees to radians conversion constant, and
RTOD = a radians to degrees conversion constant.

37. A method of navigating an aircraft comprising the steps of:
   a. establishing a plurality of navigational guidepoints which define a navigational route, each guidepoint defined by a known geographical location, and generating a first informational signal indicating the geographical locations of the navigational guidepoints;
   b. receiving navigational signals from a selected navigational station;
   c. selecting a navigational station radial to intersect at a first point of intersection a segment of the navigational route, the segment defined by two of the guidepoints, the point of intersection of the navigational radial with the navigational route defining a new navigational guidepoint, and generating a second information signal indicating the point of intersection;
   d. determining the geographical location of the point of intersection by
      1. determining the position of the selected navigational radial between two of the guidepoints, and
      2. measuring a distance along the navigational route between the navigational radial and at least one of the two guidepoints;
   e. providing the first and second informational signals to visual display means to display the geographic locations of the navigational guidepoints and the new guidepoint; and f. navigating an aircraft relative to the new navigational guidepoint by monitoring the visual display means.

38. The method as recited in claim 37 additionally comprising the step of:

a. entering information defining a second selected navigational radial from a selected geographical location; and b. providing a third informational signal indicating a second point of intersection of the navigational route with the second navigational radial to define a second new guidepoint, the first and second points of intersection each defining an intersectional fix, the navigation station and the selected geographical location each defining a geographical fix.

39. The method as recited in claim 38 additionally comprising the step of providing the first, second and third informational signals to visual display means to display the geographic locations of data for navigating relative to the second navigational guidepoint.

40. The method as recited in claim 39 additionally comprising the step of navigating the aircraft relative to the second navigational guidepoint by monitoring the visual display means.

41. A method of navigating an aircraft comprising the steps of:

a. establishing a plurality of navigational guidepoints which define a navigational route, each guidepoint defined by a known geographical location, and generating a first informational signal indicating the geographical locations;

b. providing information defining a selected distance from a selected geographic fix to intersect a segment of the navigational route at a point of intersection, the segment defined by two of the navigational guidepoints, the point of intersection of the navigational distance with the navigational route defining a new navigational guidepoint, and generating a second informational signal indicating the point of intersection which defines the new navigational guidepoint;

c. transmitting the first and second informational signals to visual display means to provide an informational display of data for navigating relative to the point of intersection; and d. navigating an aircraft relative to the point of intersection by monitoring the visual display means.

42. A method of navigating an aircraft comprising the steps of:

a. receiving navigational signals from a selected navigational station;

b. selecting a radial of the navigational station to intersect with a selected distance from the navigational station at a point of intersection, the point of intersection of the navigational station radial with the navigational station distance defining a new navigational guidepoint, and generating an information signal indicating the point of intersection;

c. providing the informational signal to visual display means to display the geographical locations of the navigational station radial, navigational station distance and the point of intersection as symbols on a cartographic display, the navigational distance being displayed as a circle having a center coincident with the selected geographical location and having a radius equal to the navigational distance, and the navigational radial being displayed as a line beginning at the center of the circle and intersecting the circle at the point of intersection; and d. navigating an aircraft relative to the point of intersection by monitoring the visual display means.

43. A method of navigating an aircraft comprising the steps of:

a. providing a navigational distance signal defining a selected distance from a selected geographical fix;

b. providing a navigational radial signal defining a selected bearing from the selected geographical fix;

c. outputting a navigational distance signal defining the selected distance from the geographical fix and a navigational radial signal defining the bearing from the selected geographical fix;

d. responding to the navigational radial signal and to the navigational distance signal, and providing an informational signal indicating a point of intersection of the navigational distance with the navigational radial to serve as a new guidepoint;

e. responding to the informational signal to provide a cartographic display of the geographical locations of the navigational radial, the navigational distance and the point of intersection, the navigational distance signal displayed as a circle having a center coincident with the selected geographical fix and having a radius equal to the navigational distance, the navigational radial being displayed as a line beginning within the circle and intersecting the circle at the point of intersection; and f. navigating an aircraft relative to the point of intersection by monitoring the visual display means.

44. An aircraft navigational system comprising:

a. input means:

1. for entering information defining a selected navigational radial from a selected geographical fix, and 2. for outputting a navigational signal defining said selected navigational radial;

b. computer means, including a memory, responsive to said selected navigational signal and arranged to:

1. provide a first informational signal indicating geographic locations of a plurality of selected guidepoints which define a navigational route, 2. respond to said navigational signal and provide a second informational signal indicating a point of intersection of said navigational route with said navigational radial to define a geographic location of a new guidepoint, 3. determine the geographic location of said new guidepoint by (i) determining the position of said selected navigational radial between two of said selected guidepoints, and (ii) measuring a distance along said navigational route between said point of intersection and at least one of said two selected guidepoints, and 4. storing data defining the geographical location of said new guidepoint in said memory.

45. The aircraft navigational system as recited in claim 44 wherein said data is displayed as symbols on a cartographic display.

46. A method for creating aircraft navigational guidepoints comprising the steps of:

a. establishing a plurality of navigational guidepoints which form a navigational route, each guidepoint defined by a known geographical location, and generating a first informational signal indicating the geopgraphical locations of the navigational guidepoints;
b. receiving navigational signals from a selected navigational station;
c. selecting a navigational station radial to intersect at a first point of intersection a segment of the navigational route, the segment defined by two of the guidepoints, the point of intersection of the navigational radial with the navigational route defining a new navigational guidepoint;
d. determining a geographical location of the new guidepoint by
   1. determining the bearing of the selected navigational radial with respect to the bearing of at least one of the selected guidepoints, and
   2. measuring the position of the navigational radial with respect to the selected one guidepoint;
e. generating a second informational signal indicating the point of intersection; and
f. providing the first and second informational signals to visual display means to display the geographical locations of the navigational guidepoints and the new guidepoint.

47. The method as recited in claim 46 additionally comprising the step of:
a. entering information defining a second selected navigational radial from a selected geographical location; and
b. providing a third informational signal indicating a second point of intersection of the navigational route with the second navigational radial to define a second new guidepoint, the first and second points of intersection each defining an intersectional fix, the navigation station and the selected geographical location each defining a geographical fix.

48. The method as recited in claim 47 additionally comprising the step of providing the first, second and third informational signals to visual display means to display the geographic locations of data for navigating relative to the first and second navigational guidepoints.

* * * * *